(12) United States Patent
Farag et al.

(10) Patent No.: US 12,069,634 B2
(45) Date of Patent: Aug. 20, 2024

(54) METHOD AND APPARATUS FOR PREDICTIVE BEAM MANAGEMENT

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US); Dalin Zhu, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 17/644,321

(22) Filed: Dec. 14, 2021

(65) Prior Publication Data

US 2022/0210781 A1 Jun. 30, 2022

Related U.S. Application Data

(60) Provisional application No. 63/131,235, filed on Dec. 28, 2020.

(51) Int. Cl.
*H04W 72/044* (2023.01)
*H04W 64/00* (2009.01)
*H04W 72/542* (2023.01)

(52) U.S. Cl.
CPC ....... *H04W 72/046* (2013.01); *H04W 64/003* (2013.01); *H04W 72/542* (2023.01)

(58) Field of Classification Search
CPC ..... H04B 7/0634; H04L 5/005; H04L 5/0023; H04L 5/0048; H04L 5/0053;
(Continued)

(56) References Cited

U.S. PATENT DOCUMENTS

2018/0332520 A1* 11/2018 Cheng ............... H04W 74/0891
2019/0268053 A1* 8/2019 John Wilson ......... H04W 76/38
(Continued)

FOREIGN PATENT DOCUMENTS

WO 2020141484 A1 7/2020
WO 2020165244 A1 8/2020
(Continued)

OTHER PUBLICATIONS

International Search Report and Written Opinion issued Apr. 1, 2022 regarding International Application No. PCT/KR2021/020023, 8 pages.
(Continued)

*Primary Examiner* — Harun Chowdhury

(57) ABSTRACT

Methods and apparatuses for predictive beam management in a wireless communication system. A method of operating a user equipment (UE) includes receiving configuration information for transmission configuration indication (TCI) states; receiving information indicating a number of TCI states and a number of corresponding TCI state application times; and determining, for one or more TCI states in the number of TCI states, at least one of downlink (DL) quasi-co-location (QCL) properties for DL communication and an uplink (UL) spatial domain filter for UL communication. The method further includes at least one of receiving, using the determined DL QCL properties, DL channels starting at the corresponding TCI state application times and transmitting, using the determined UL spatial filter, UL channels starting at the corresponding TCI state application times.

20 Claims, 15 Drawing Sheets

(58) Field of Classification Search
CPC ............. H04W 64/003; H04W 72/046; H04W 74/0891; H04W 76/38
USPC .................................. 370/252, 318, 329, 330
See application file for complete search history.

(56) References Cited

U.S. PATENT DOCUMENTS

| | | |
|---|---|---|
| 2020/0106559 A1 | 4/2020 | Vilaipornsawai et al. |
| 2020/0106645 A1 | 4/2020 | Tsai et al. |
| 2020/0267750 A1 | 8/2020 | Park et al. |
| 2021/0409176 A1* | 12/2021 | Sakhnini ................ H04L 5/005 |

FOREIGN PATENT DOCUMENTS

| | | | |
|---|---|---|---|
| WO | WO-2022066391 A1 | * | 3/2022 |
| WO | WO-2022106428 A1 | * | 5/2022 |

OTHER PUBLICATIONS

"5G; NR; Physical channels and modulation (3GPP TS 38.211 version 16.7.0 Release 16)", ETSI TS 138 211 V16.7.0, Oct. 2021, 138 pages.

"5G; NR; Multiplexing and channel coding (3GPP TS 38.212 version 16.7.0 Release 16)", ETSI TS 138 212 V16.7.0, Oct. 2021, 157 pages.

"5G; NR; Physical layer procedures for control (3GPP TS 38.213 version 16.7.0 Release 16)", ETSI TS 138 213 V16.7.0, Oct. 2021, 191 pages.

"5G; NR; Physical layer procedures for data (3GPP TS 38.214 version 16.7.0 Release 16)", ETSI TS 138 214 V16.7.0, Oct. 2021, 176 pages.

"5G; NR; Medium Access Control (MAC) protocol specification (3GPP TS 38.321 version 16.6.0 Release 16)", ETSI TS 138 321 V16.6.0, Oct. 2021, 160 pages.

"5G; NR; Radio Resource Control (RRC); Protocol specification (3GPP TS 38.331 version 16.6.0 Release 16)", ETSI TS 138 331 V16.6.0, Oct. 2021, 948 pages.

Extended European Search Report issued Feb. 6, 2024 regarding Application No. 21915751.8, 10 pages.

Samsung, "On Beam Management, Measurement and Reporting", 3GPP TSG RAN WG1 Meeting 90bis, R1-1717605, Oct. 2017, 16 pages.

ZTE, "Enhancements on predictable mobility for beam management", 3GPP TSG RAN WG Meeting #90-e, RP-202675, Dec. 2020, 7 pages.

Qualcomm, "Beam management for NR", 3GPP TSG-RAN WG1 #90bis, R1-1718541, Oct. 2017, 17 pages.

* cited by examiner

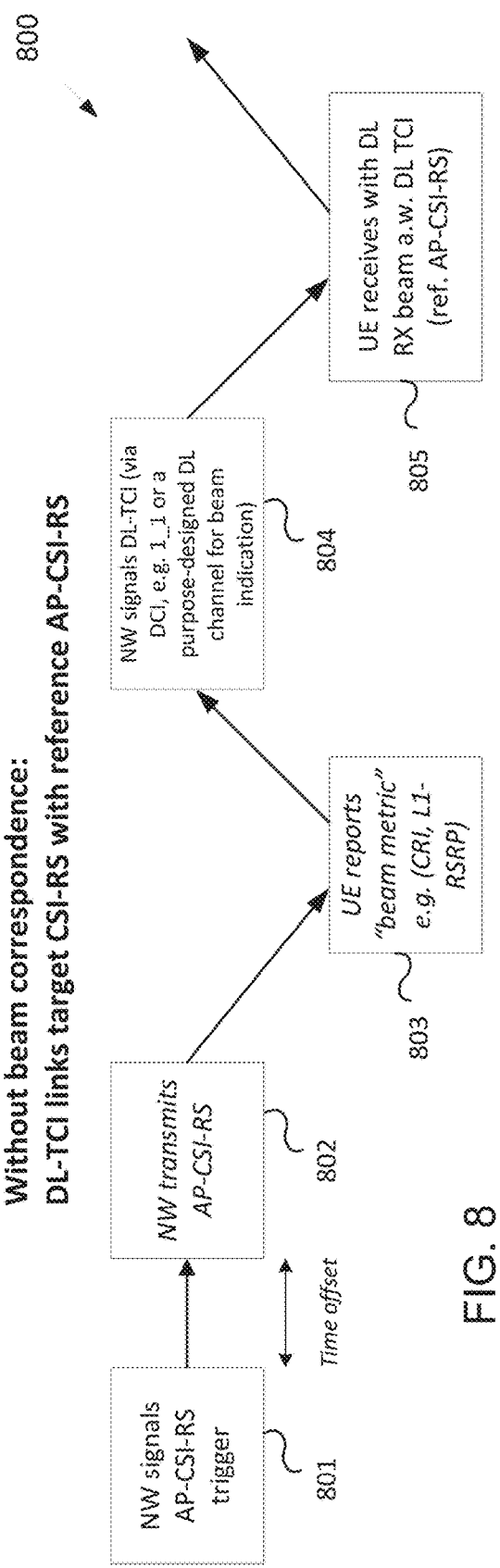
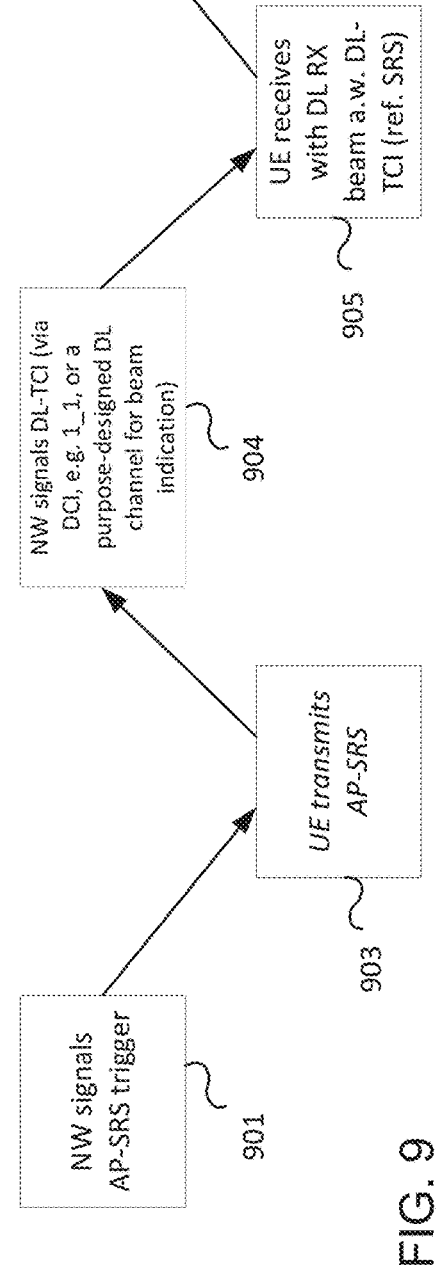
FIG. 8
FIG. 9

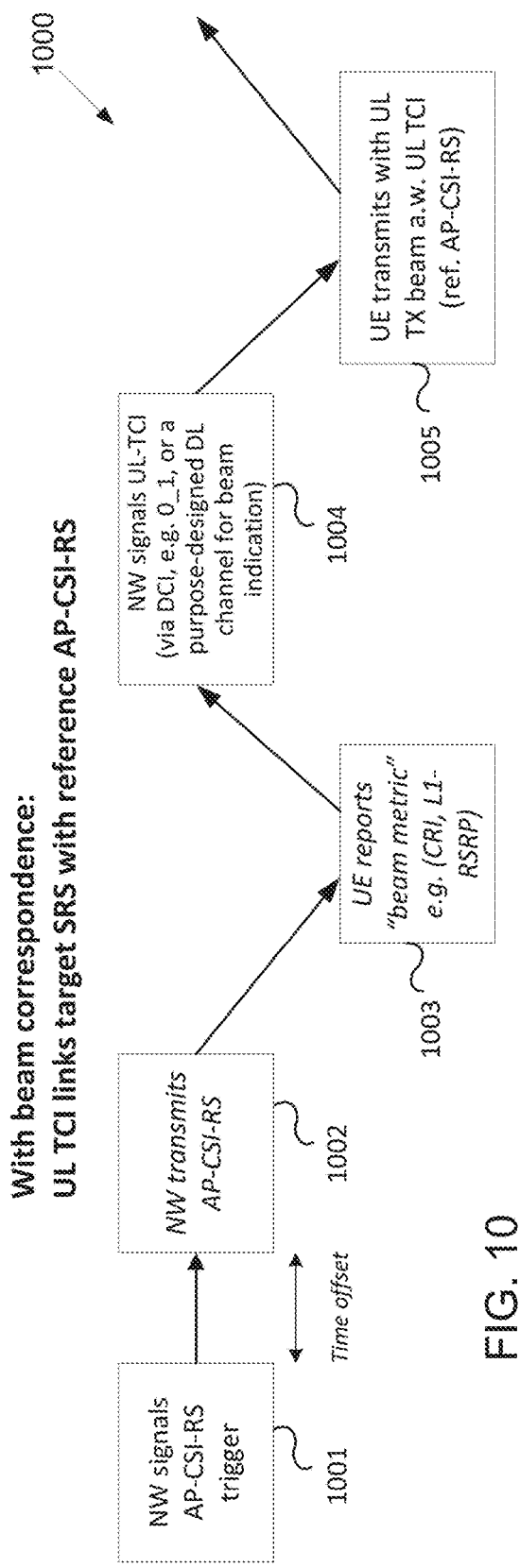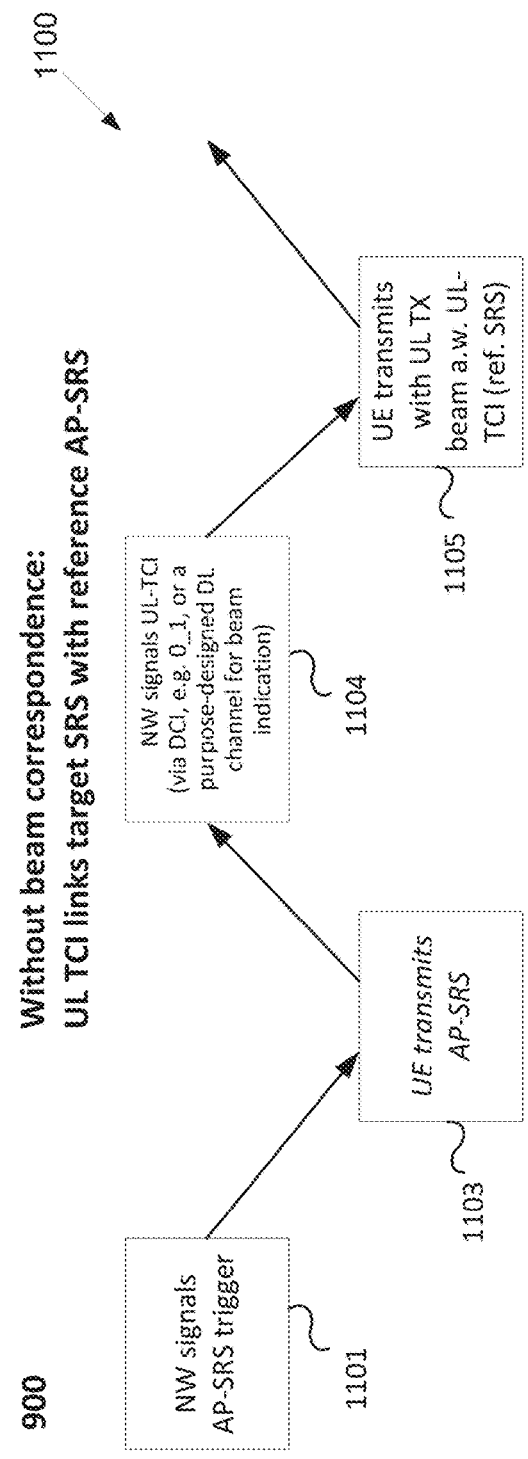
FIG. 10
FIG. 11

METHOD AND APPARATUS FOR PREDICTIVE BEAM MANAGEMENT

CROSS-REFERENCE TO RELATED APPLICATIONS AND CLAIM OF PRIORITY

The present application claims priority to U.S. Provisional Patent Application No. 63/131,235, filed on Dec. 28, 2020. The content of the above-identified patent document is incorporated herein by reference.

TECHNICAL FIELD

The present disclosure relates generally to wireless communication systems and, more specifically, the present disclosure relates to predictive beam management in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to predictive beam management in a wireless communication system.

In one embodiment, a user equipment (UE) is provided. The UE includes a transceiver configured to receive configuration information for transmission configuration indication (TCI) states and receive information indicating a number of TCI states and a number of corresponding TCI state application times. The UE further includes a processor operably coupled to the transceiver. The processor is configured to determine, for one or more TCI states in the number of TCI states, at least one of downlink (DL) quasi-co-location (QCL) properties for DL communication and an uplink (UL) spatial domain filter for UL communication. The transceiver is further configured to at least one of receive, using the determined DL QCL properties, DL channels starting at the corresponding TCI state application times and transmit, using the determined UL spatial filter, UL channels starting at the corresponding TCI state application times.

In another embodiment, a base station (BS) is provided. The BS includes a transceiver configured to transmit configuration information for TCI states and transmit information indicating a number of TCI states and a corresponding number of TCI state application times. The BS further includes a processor operably coupled to the transceiver. The processor is configured to determine, for one or more TCI states in the number of TCI states, at least one of DL QCL properties for DL communication and an UL spatial domain filter for UL communication. The transceiver is further configured to at least one of transmit, using the determined DL QCL properties, DL channels starting at the corresponding TCI state application times and receive, using the determined UL spatial filter, UL channels starting at the corresponding TCI state application times.

In yet another embodiment, a method of operating a UE is provided. The method includes receiving configuration information for TCI states; receiving information indicating a number of TCI states and a number of corresponding TCI state application times; and determining, for one or more TCI states in the number of TCI states, at least one of downlink DL QCL properties for DL communication and an UL spatial domain filter for UL communication. The method further includes at least one of receiving, using the determined DL QCL properties, DL channels starting at the corresponding TCI state application times and transmitting, using the determined UL spatial filter, UL channels starting at the corresponding TCI state application times.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example of beam management framework according to embodiments of the present disclosure;

FIG. 9 illustrates another example of beam management framework according to embodiments of the present disclosure;

FIG. 10 illustrates yet another example of beam management framework according to embodiments of the present disclosure;

FIG. 11 illustrates yet another example of beam management framework according to embodiments of the present disclosure;

DETAILED DESCRIPTION

FIG. 1 through FIG. 21, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.7.0, "NR; Physical channels and modulation"; 3GPP TS 38.212 v16.7.0, "NR; Multiplexing and Channel coding"; 3GPP TS 38.213 v16.7.0, "NR; Physical Layer Procedures for Control"; 3GPP TS 38.214 v16.7.0, "NR; Physical Layer Procedures for Data"; 3GPP TS 38.321 v16.6.0, "NR; Medium Access Control (MAC) protocol specification"; and 3GPP TS 38.331 v16.6.0, "NR; Radio Resource Control (RRC) Protocol Specification."

Figure 1:
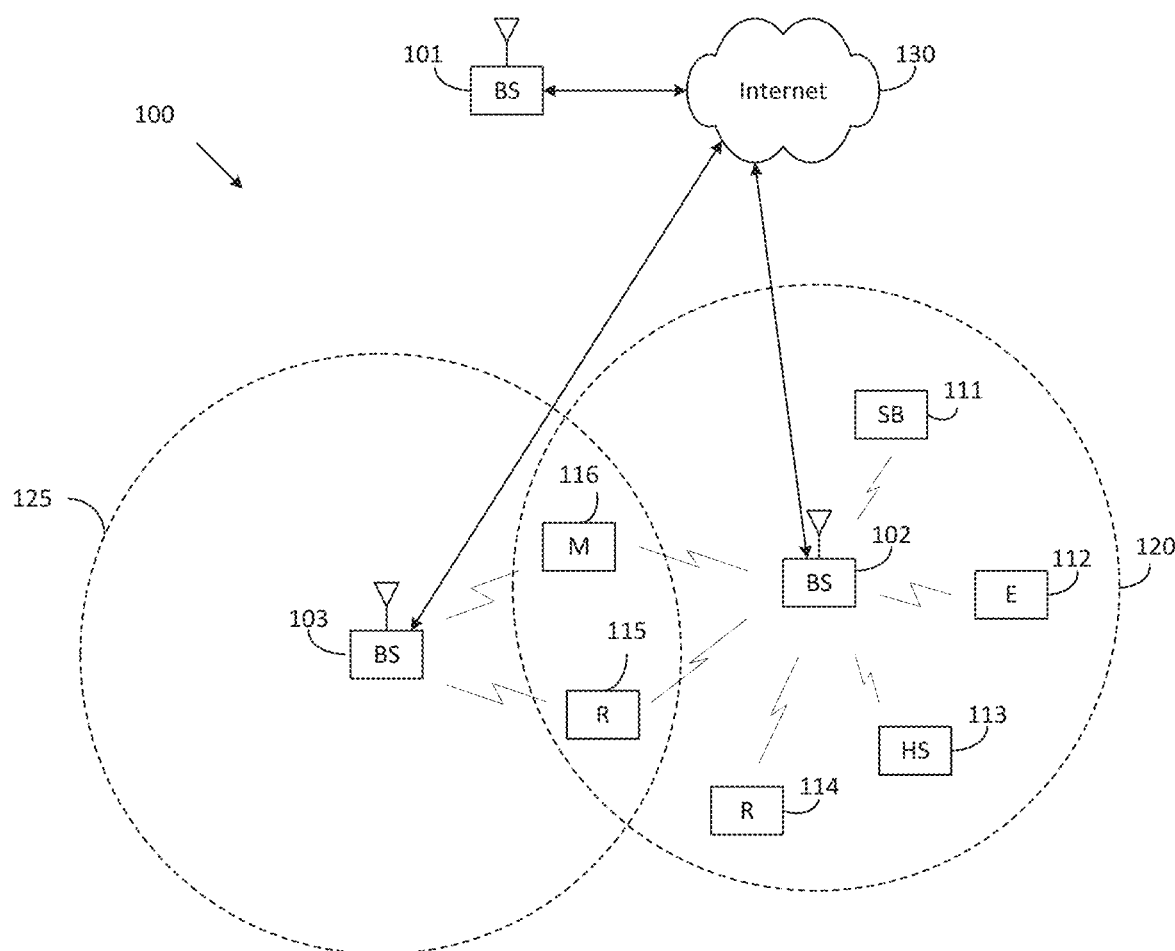
FIG. 1 illustrates an example of wireless network according to embodiments of the present disclosure.
Figure 2:
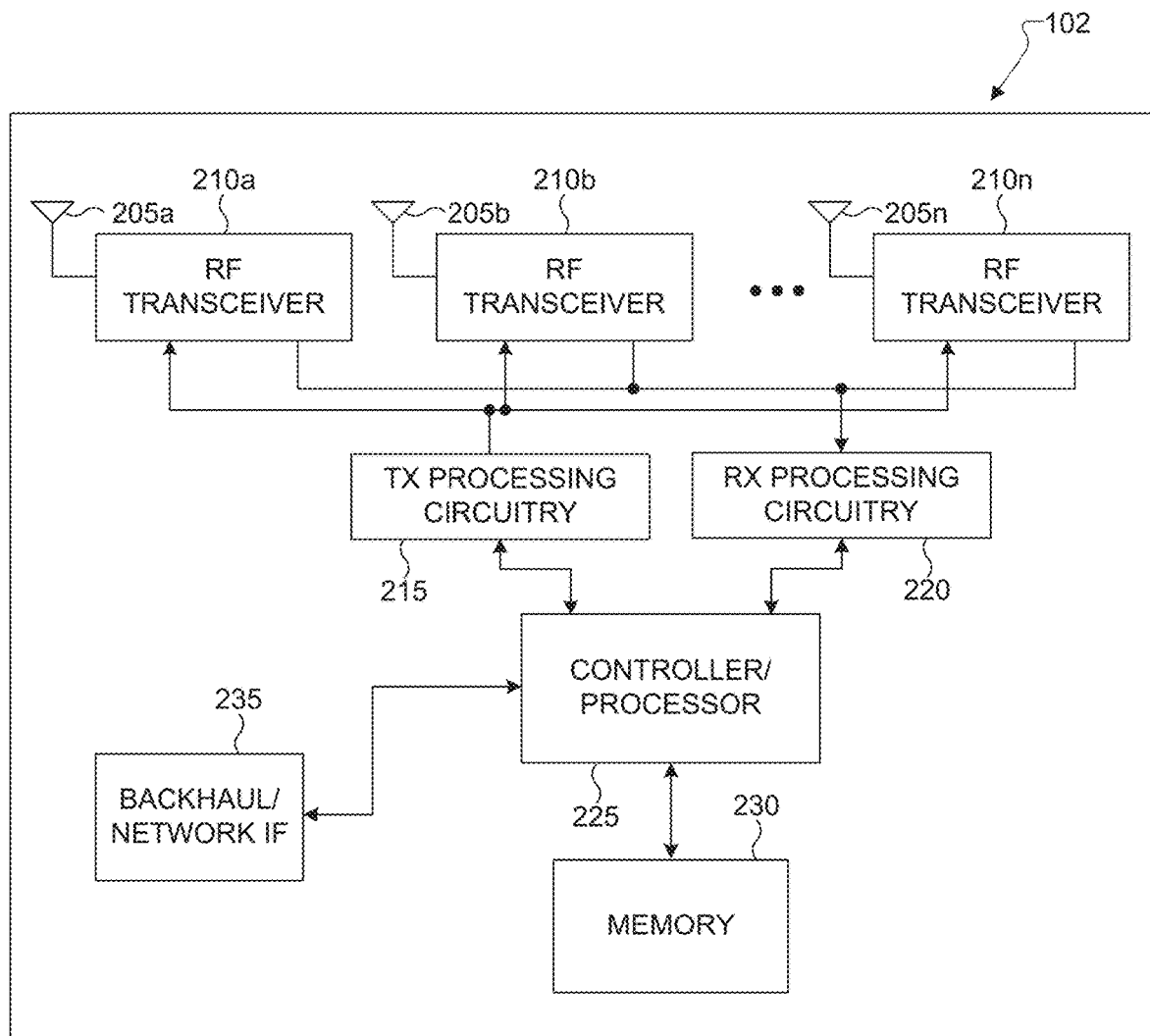
FIG. 2 illustrates an example of gNB according to embodiments of the present disclosure.
Figure 3:
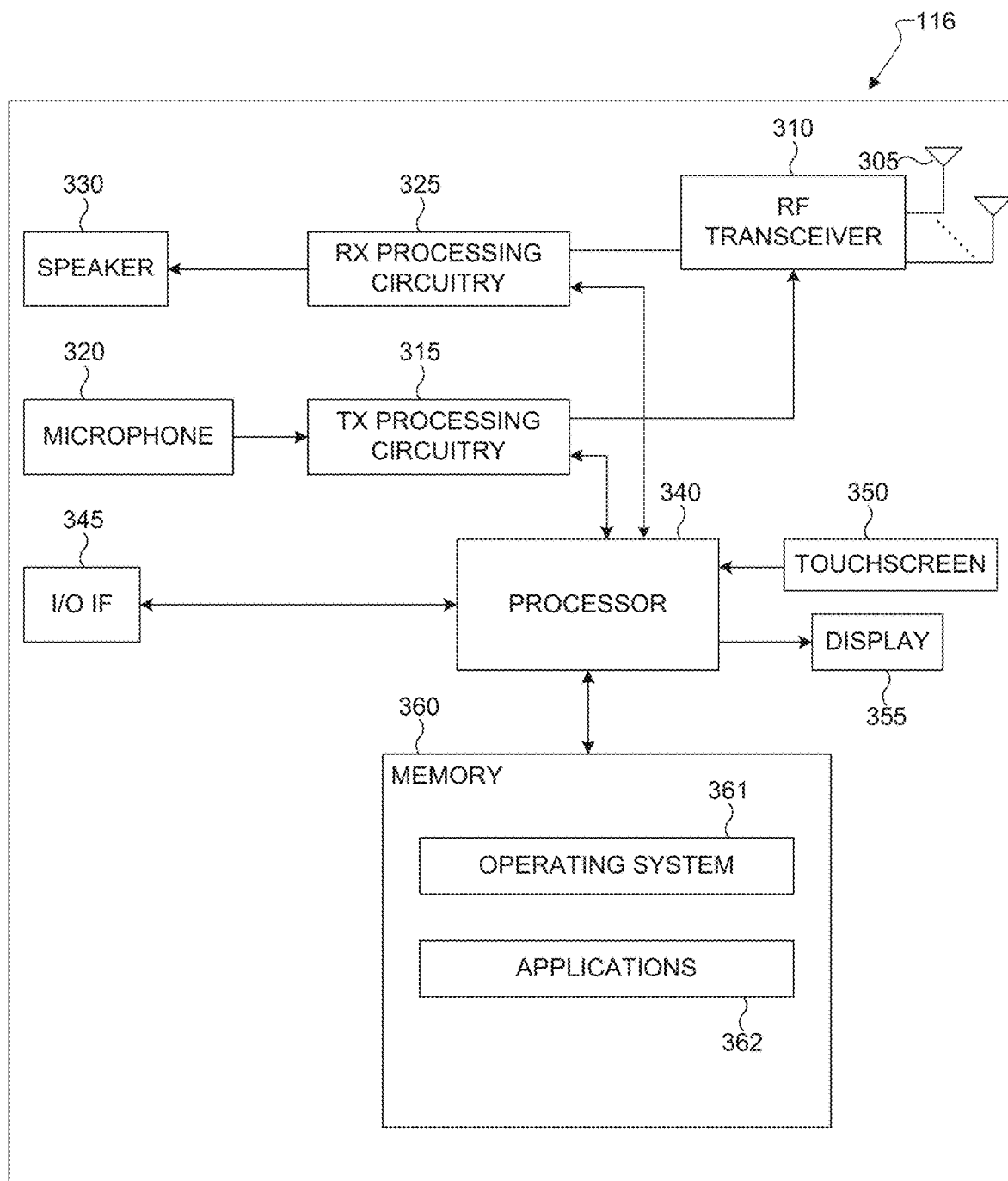
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for predictive beam management in a wireless communication system. In certain embodiments, and one or more of the gNBs 101-103 includes circuitry, programing, or a combination thereof, for predictive beam management in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of DL channel signals and the transmission of UL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for predictive beam management in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
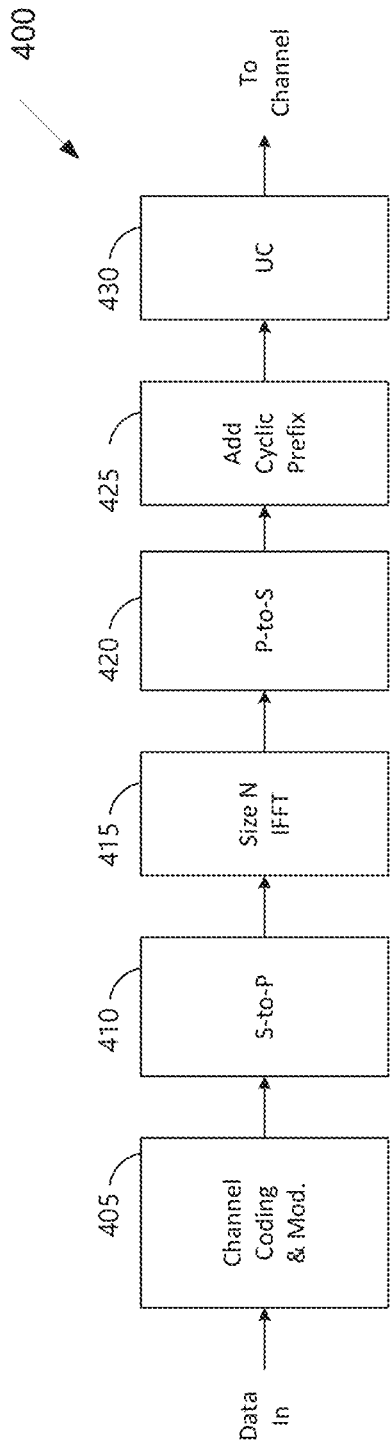
FIGS. 4 and 5 illustrate example of wireless transmit and receive paths according to this disclosure.
Figure 5:
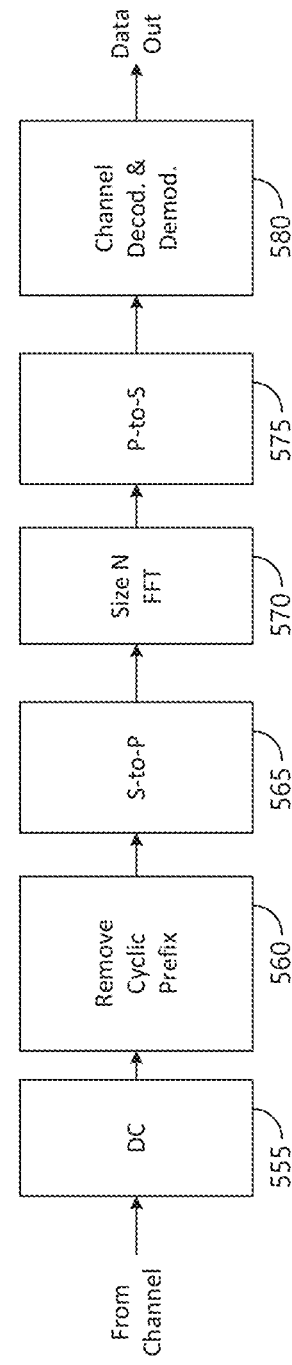

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
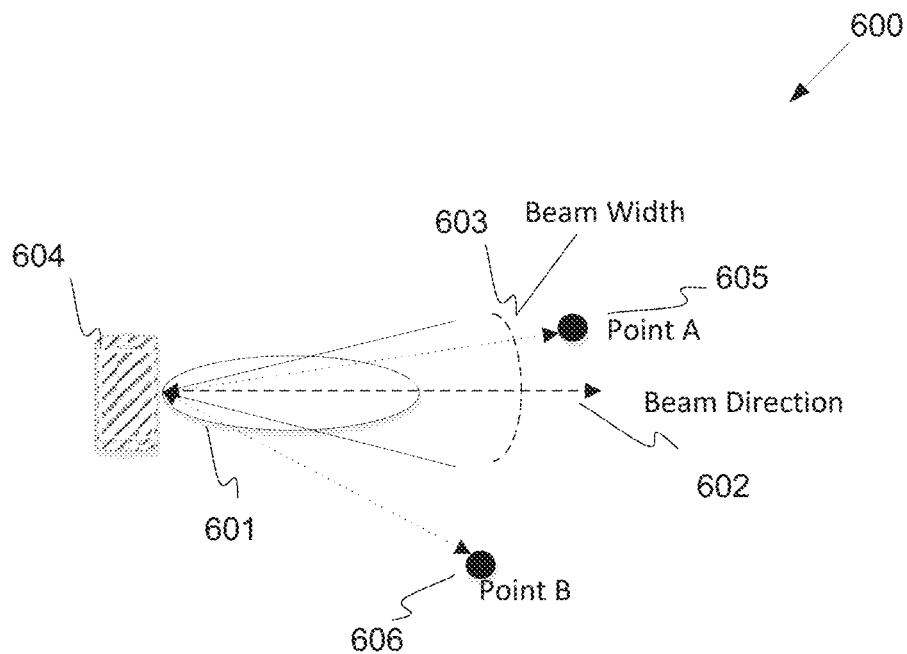
FIG. 6A illustrate an example of wireless system beam according to embodiments of the present disclosure.

FIG. 6A illustrate an example wireless system beam 600 according to embodiments of the present disclosure. An embodiment of the wireless system beam 600 shown in FIG. 6A is for illustration only.

As illustrated in FIG. 6A, in a wireless system a beam 601, for a device 604, can be characterized by a beam direction 602 and a beam width 603. For example, a device 604 with a transmitter transmits radio frequency (RF) energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604.

As illustrated in FIG. 6A, a device at point B 606 cannot receive from and transmit to the device 604 as Point B is outside a beam width of a beam traveling in a beam direction and coming from the device 604. While FIG. 6A, for illustrative purposes, shows a beam in 2-dimensions (2D), it may be apparent to those skilled in the art, that a beam can be in 3-dimensions (3D), where the beam direction and beam width are defined in space.

Figure 6B:
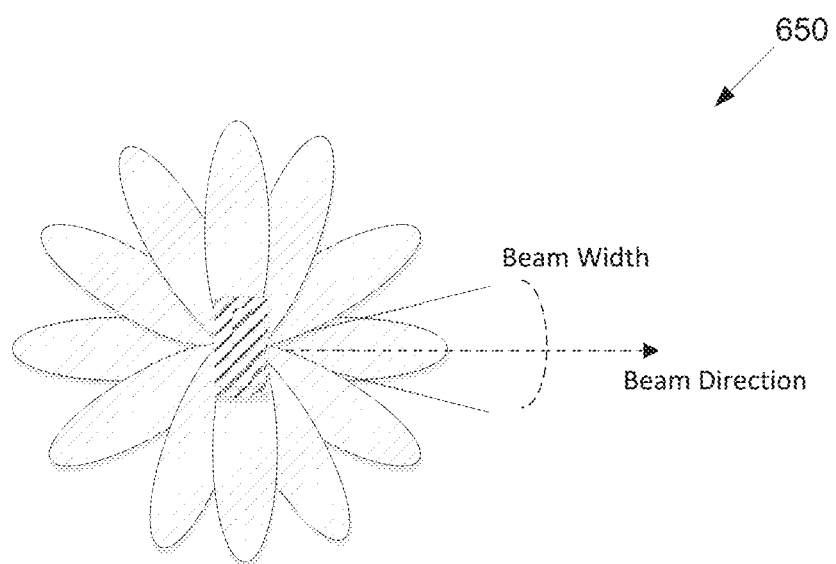
FIG. 6B illustrate an example of multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
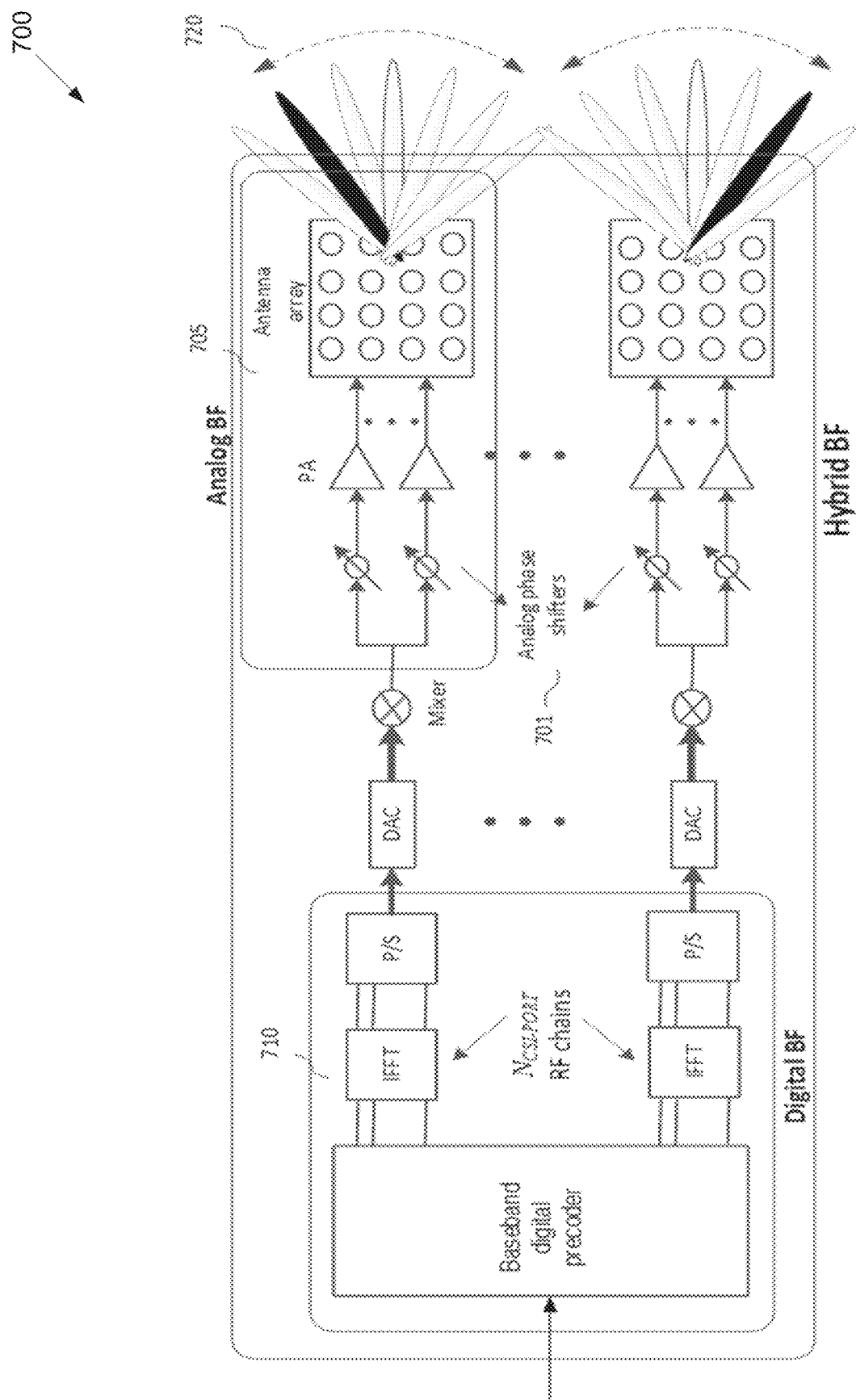
FIG. 7 illustrate an example of antenna structure according to embodiments of the present disclosure.

FIG. 7 illustrate an example antenna structure 700 according to embodiments of the present disclosure. An embodiment of the antenna structure 700 shown in FIG. 7 is for illustration only.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI\_PORT}$ Analog Beams to Further Increase Precoding Gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

NR Rel.16 introduced positioning solutions that enabled RAT dependent, as well as RAT independent, positioning for FR1 and FR2. The positioning reference signal (PRS) is a downlink reference signal used for positioning. The sounding reference signal (SRS) for positioning is an uplink reference signal used for positioning. Release 16 RAT dependent methods and schemes include:

Time difference of arrival schemes such as DL-time difference of arrival (DL-TDOA), and UL-time difference of arrival (UL-TDOA).

Angle-based schemes such as DL angle of departure (DL-AoD), and UL angle of arrival (UL-AoA).

Multi-cell Round Trip Time (RTT).

Enhanced Cell ID (E-CID).

NR Rel.16 introduced UE measurements based on DL reference signals applicable for positioning such as DL reference signal time difference measurement (DL-RSTD), DL reference signal receive power (DL-RSRP), and UE RX-TX time difference measurements. NR Rel.16 introduced gNB measurements based on UL reference signals applicable for positioning such as UL relative time of arrival (UL-RTOA), UL-AoA, UL reference signal receive power (UL-RSRP), and gNB RX-TX time difference measurements.

In NR Rel.17 the performance of positioning is further enhanced by improving positioning accuracy, latency, network and device efficient.

There are two types of positioning schemes: (1) UE-assisted positioning, wherein a UE performs positioning measurements on the PRS and sends a measurement report to the location management function (LMF) and (2) UE-based positioning, wherein a UE performs positioning measurements on the PRS and determines its location.

In the present disclosure, utilizing the UE-based positioning information is provided to assist in beam management.

UEs in a network, provide beam measurement reports. Included in the beam measurement report is information about the UE's position at the time of measurement, and optionally the time of the measurement.

The network uses the beam measurement reports to create a spatial map of the wireless multi-path channel.

A UE provides the UE's current position and velocity to the network enabling the network to estimate the trajectory of the UE in the near future.

Based on the trajectory of the UE in the near future and the estimated spatial map of the wireless multi-path channel, a network can signal to the UE future beam indications (e.g., transmission configuration indicator (TCI) states), and the time at which these beam indications (e.g., TCI states) become active.

The present disclosure has the following main components: (1) an indication of future beam indications (e.g., TCI states) and the time at which these beam indications (e.g., TCI states) become active; (2) measurement reports from the UE to the network to enable the network to generate a spatial map of the wireless multi-path channel, and enabling the network to estimate the trajectory of the UE in the near future; and (3) a linkage between the UE position and/or PRS beam measurements and beams used by the UE represented by TCI states.

In release 15/16 the beam management framework includes beam measurement, a beam reporting, and a beam indication. This is a reactive procedure, when the multi-path conditions of the channel change, the network triggers the transmission of reference signals for channel measurement, in response, the UE measures the downlink reference signal (e.g., CSI-RS or SSB) or the gNB measures the uplink reference signal (e.g., SRS).

For downlink reference signal measurements, the UE sends a beam measurement report to the network; for uplink reference signal measurements, the beam measurement report is already at the gNB. Based on the beam measurement report, the network selects a beam and indicates the corresponding beam identifier (ID) (e.g., TCI state or SRS resource indicator (SRI), or spatial relation information) to the UE. The UE uses the beam indication to tune the UE's spatial receive filter for reception of downlink channels and the UE's spatial transmit filter for transmission of uplink channels. The latency between the appearance of a new beam and measurement of the new beam to the application of the beam ID to the spatial filters can be in the range of 10s of milli-seconds if not more. In fast changing multi-path channel conditions, the beam can become obsolete or nearly obsolete by the time it is applied to the spatial filters at the UE and at the gNB. To address this issue, predictive beam management is provided. The predictive beam management framework has several components.

The network maintains a spatial map of the multi-path channel based on beam measurement reports from UEs in the vicinity/coverage area of the gNB/TRP/RRH that include the UE's position at the time of the beam measurement.

The UE can report the UE's position and velocity at a certain time. This allows the network to estimate the trajectory of the UE in the near future.

The network can signal a UE one or more beam indications (e.g., TCI states), with an activation time for each beam indication (e.g., TCI state). The beam indications and their corresponding activation times are determined by the network based on the spatial map of the multi-path channel and the estimated trajectory of the UE. The UE applies each beam indication at corresponding activation time.

Linkage between the UE position and/or PRS beam measurements and beams used by the UE represented by TCI states.

The present disclosure relates to a 5G/NR communication system.

The present disclosure provides design aspects for predictive beam indication to reduce the beam activation time latency. The predictive beam management framework has several components.

The present disclosure provides several components that can be used in conjunction or in combination with one another, or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated, or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. This is referred to as quasi-co-location (QCL) properties. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics (e.g., spatial domain filter) of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS, or can be configured with a certain time-domain behavior, such as a periodicity and offset in case of periodic RS, or can be a combination of such configuration and activation/deactivation in case of semi-persistent RS.

For mmWave bands (or frequency range 2 (FR2)) or for higher frequency bands (such as >52.6 GHz) (or for FR2-1 for 24.25-52.6 GHz, and FR2-2 for 52.6-71 GHz (two ranges under the FR2 common range)) where multi-beam operation is especially relevant, a transmission-reception process includes a receiver selecting an RX beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam.

In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs.

Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence. In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

FIG. 8 illustrates an example of beam management framework 800 according to embodiments of the present disclosure. An embodiment of the beam management framework 800 shown in FIG. 8 is for illustration only.

In one example illustrated in FIG. 8 (embodiment A-1), a DL multi-beam operation 800 starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset).

For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated L1-RSRP/L1-RSRQ/BL1-SINR/CQI.

Upon receiving the beam report from the UE, the gNB/NW can use the beam report to select a DL RX beam for the UE and indicate the DL RX beam selection (step 804) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805). The DL RX beam determines the QCL properties to use for reception of DL channels.

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) set while a UE-group common DL channel can be a PDCCH that a UE receives according to a common search space (CSS) set.

In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805). The DL RX beam determines the QCL properties to use for reception of DL channels.

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

FIG. 9 illustrates another example of beam management framework 900 according to embodiments of the present disclosure. An embodiment of the beam management framework 900 shown in FIG. 9 is for illustration only.

In another example illustrated in FIG. 9 (embodiment A-2), an DL multi-beam operation 900 starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905). The DL RX beam determines the QCL properties to use for reception of DL channels.

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set.

In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905). The DL RX beam determines the QCL properties to use for reception of DL channels.

For this embodiment (A-2), as described above, the UE selects the DL RX beam based on the UL TX beam associated with the reference RS (AP-SRS) index signaled via the TCI-state field.

Similar, for UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam.

As a result, a TX-RX beam pair is derived. The NW/gNB can perform this operation for all the configured reference RS s, either per reference RS or by "beam sweeping," and determine all the TX-RX beam pairs associated with all the reference RSs configured to the UE. Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam).

In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS and a UE receives and measures the CSI-RS. This embodiment can be used, for instance, at least when there is reciprocity between the UL and DL beam-pair-link (BPL). This condition is termed "UL-DL beam correspondence."

In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

FIG. 10 illustrates yet another example of beam management framework 1000 according to embodiments of the present disclosure. An embodiment of the beam management framework 1000 shown in FIG. 10 is for illustration only.

In one example illustrated in FIG. 10 (embodiment B-1), an UL multi-beam operation 1000 starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger, and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CSI-RS resource indicator (CRI) or SSB-RI together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005). The UL TX beam determines a spatial domain filter to use for transmission of UL channels.

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set.

In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1005). The UL TX beam determines a spatial domain filter to use for transmission of UL channels.

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

FIG. 11 illustrates yet another example of beam management framework 1100 according to embodiments of the present disclosure. An embodiment of the beam management framework 1100 shown in FIG. 11 is for illustration only.

In another example illustrated in FIG. 11 (embodiment B-2), an UL multi-beam operation 1100 starts with the gNB/NW signaling to a UE an aperiodic SRS (AP-SRS) trigger or request (step 1101). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105). The UL TX beam determines a spatial domain filter to use for transmission of UL channels.

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS set while a UE-group common DL channel can be a PDCCH that a UE receives according to a CSS set.

In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105). The UL TX beam determines a spatial domain filter to use for transmission of UL channels.

For this embodiment (B-2), as described above, the UE selects the UL TX beam from the reference RS (in this case SRS) index signaled via the value of the TCI-state field.

In any of the following components, examples and sub-examples, flowcharts and diagrams maybe used for illustrative purposes. The present disclosure covers any possible variation of the flowcharts and diagrams as long as at least some of the components are included.

In the present disclosure, a TCI state is used for beam indication. It can refer to a DL TCI state for downlink channels (e.g., PDCCH and PDSCH), an uplink TCI state for uplink channels (e.g., PUSCH or PUCCH), a joint TCI state for downlink and uplink channels, or separate TCI states for uplink and downlink channels. A TCI state can be common across multiple component carriers or can be a separate TCI state for a component carrier or a set of component carriers. A TCI state can be gNB or UE panel specific or common across panels. In some examples, the uplink TCI state can be replaced by SRI or spatial relation information.

In the present disclosure, a TCI state can refer to a DL TCI state an UL TCI state, a joint TCI state for UL and DL channels/signals or a separate DL/UL TCI (with a common TCI state for DL channels/signals and a common TCI state UL channels/signals). A TCI state can refer to a TCI state to a radio resource (RR).

As described in FIG. 8, FIG. 9, FIG. 10, and FIG. 11, the beam management framework according to Rel.15/Rel.6 includes following examples.

In one example for triggering the transmission of a reference signal for measuring the channel, the reference signal can be an aperiodic signal, a semi-persistent signal or a periodic signal.

In another example for the actual transmission of the reference signal and measuring a beam quality metric, for example, the beam quality metric can be L1-RSRP, L1-SINR, CQI, BLER or some other beam quality metric.

In yet another example, the beam quality metric is reported to the network, in case of a beam measurement report at the UE. The beam measurement report includes at least a resource ID of the resource (e.g., reference signal such CSI-RS or SSB) used to measure the beam quality metric and the beam quality metric.

In yet another example, a network selects a beam and signals the beam to the UE.

In yet another example, a UE and a gNB apply the beam to the spatial filters used to transmit and receive.

The above procedure is done sequentially and starts after a new multi-path appears, the time between the appearance of a new multi-path, measuring the multi-path and the application of the beam to the spatial filters can be in the order of 10's of milli-seconds if not more. In fast changing channel conditions, such as that of high-speed trains or vehicles traveling along a highway this can be a long time, and by the time the beam is about to be applied to the spatial filter it is already obsolete or nearly obsolete. To address this issue, a predictive beam management framework is provided as shown in FIG. 12.

Figure 12:
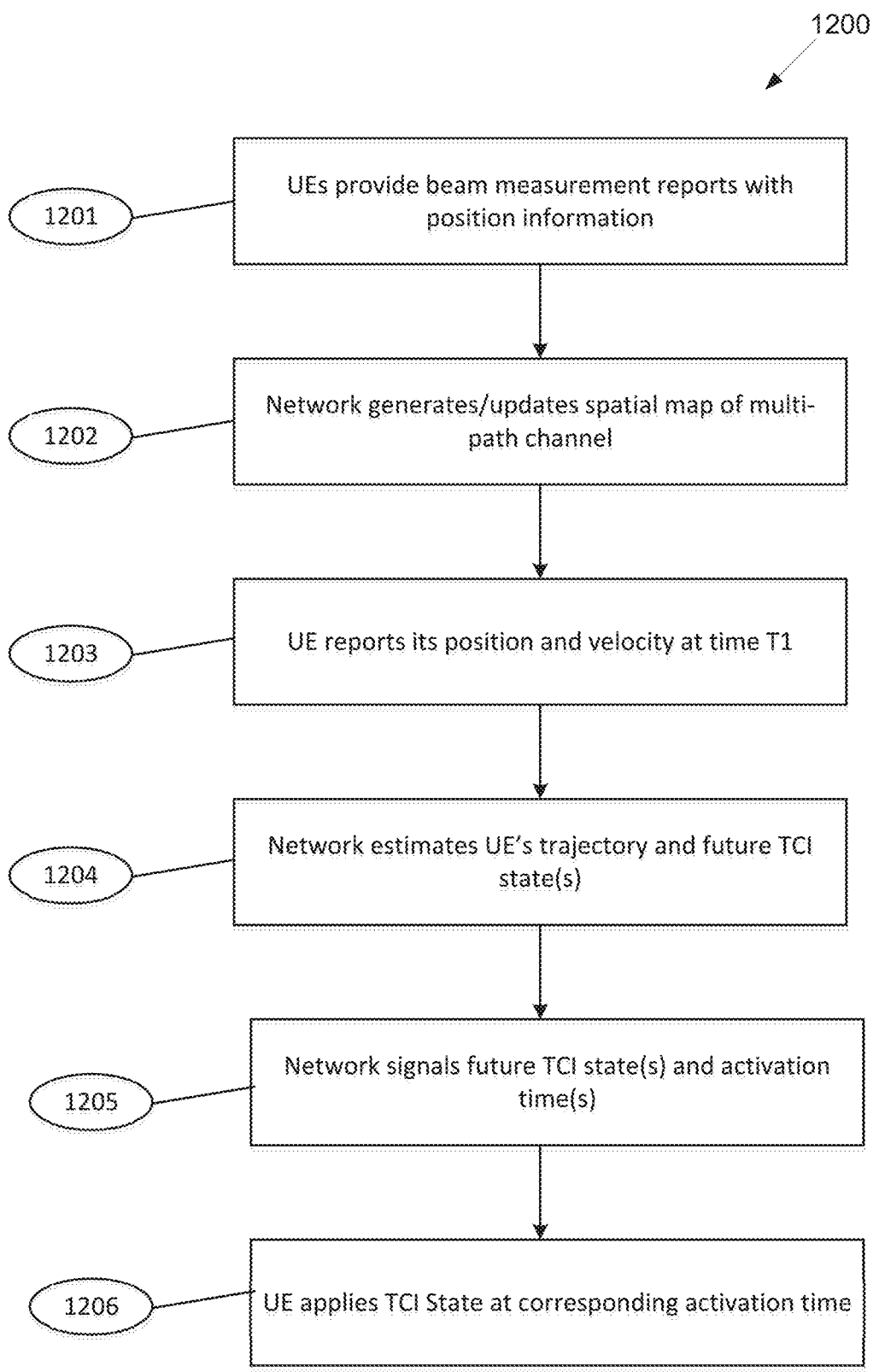
FIG. 12 illustrates a flowchart of a method for predictive beam management according to embodiments of the present disclosure.

FIG. 12 illustrates a flowchart of a method 1200 for predictive beam management according to embodiments of the present disclosure. For example, the method 1200 as may be performed by a UE (e.g., 111-116 as illustrated in FIG. 1) or a base station (e.g., 101-103 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, in step 1201, UEs in the vicinity/coverage area of the gNB/TRP/RRH provide beam measurement reports. The beam measurement report includes; a resource indicator, along with a beam quality metric, the position and possibly velocity associated with the beam measurement and optionally the time of the beam measurement. The beam measurement report is described in component 2.

In step 1202, the network uses the beam measurement reports, along with the position and optionally time information to generate a spatial map of the multi-path channel. Determining the spatial map of the multi-path channel includes identifying the multi-path components at each location, or associated with each positioning measurement. The network may use artificial intelligence techniques to determine the multi-path at each spatial location and temporal variations.

In step 1203, a UE reports the UE's position and/or velocity at a time T1. The UE position and velocity report is described in component 2.

In step 1204, the network, using a UE's position and/or velocity report at time T1, can estimate the UE's trajectory in the near future and predict the beam indications (TCI states) and the activation time for each beam indication along the trajectory.

In step 1205, the network indicates to the UE the beam indication(s) (TCI state(s)) to use in the near future along with the activation time for each beam indication (TCI state). Component 1 describes advanced beam indication.

In step 1206, the UE applies the beam indication(s) (TCI state(s)) to the spatial filters at the corresponding activation time.

A TCI state ID, or multiple TCI state IDs can indicate a future spatial filter when a UE is moving in a known trajectory, with a known speed. In the present disclosure, more details about linking a beam indication (e.g., TCI state or spatial relation) with an activation time are provided. Furthermore, design aspects regarding the linkage of a beam measurement report and positioning report are provided, as well as linking a TCI state to a positioning location/velocity or to a positioning PRS/velocity measurement. Positioning PRS measurements, can include DL-PRS-RSRP and/or DL-PRS-RSTD and/or UE RX-TX time difference measurements.

Figure 13:
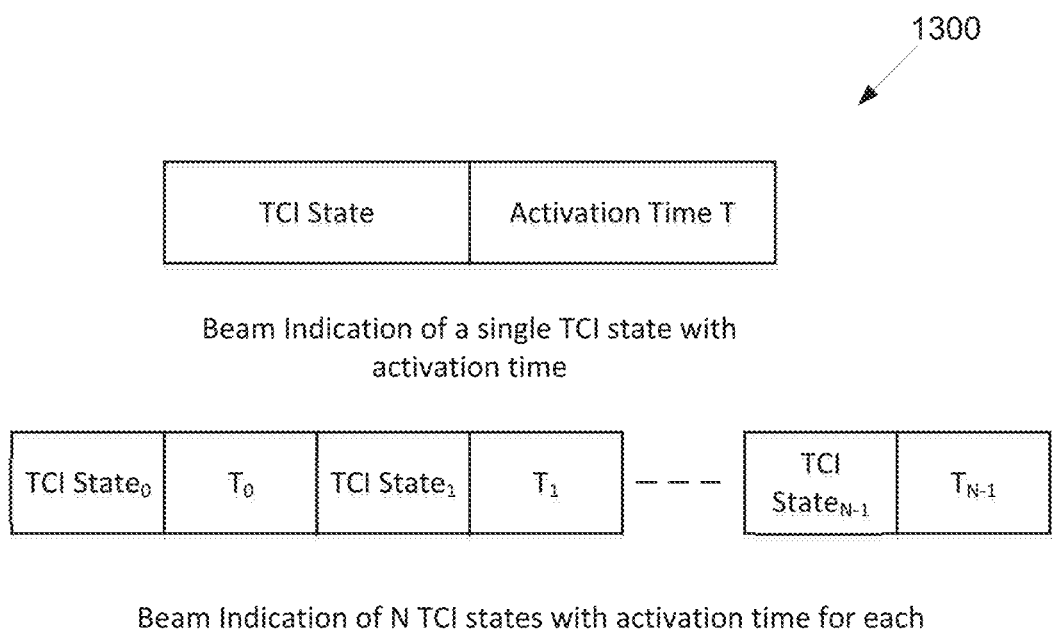
FIG. 13 illustrates an example of a beam indication comprising a TCI state and an activation time according to embodiments of the present disclosure.

FIG. 13 illustrates an example of a beam indication 1300 comprising a TCI state and an activation time according to embodiments of the present disclosure. An embodiment of the beam indication 1300 shown in FIG. 13 is for illustration only.

In one example 1.1 of Component 1, a beam indication includes a TCI state and an activation time as shown in FIG. 13. Wherein: (1) a TCI state can be based on a TCI state ID configured by RRC signaling and/or TCI state ID codepoint activated by MAC CE signaling as described in U.S. patent application Ser. No. 17/444,556 filed Aug. 5, 2021 as incorporated by reference herein; and (2) in one example 1.1.1, an activation time can be a time relative to the time of the signaling of the beam indication or relative to the time of acknowledgement of the signaling of the beam indication. Wherein, the activation time can be in units of symbols and/or slots and/or subframes and/or radio frames and/or milli-seconds or any combination of these time units. In another example 1.1.2, an activation time can indicate a future symbol and/or slot and/or subframe and/or frame and/or time in milli-seconds or seconds at which the indicated TCI state becomes active.

Figure 14:
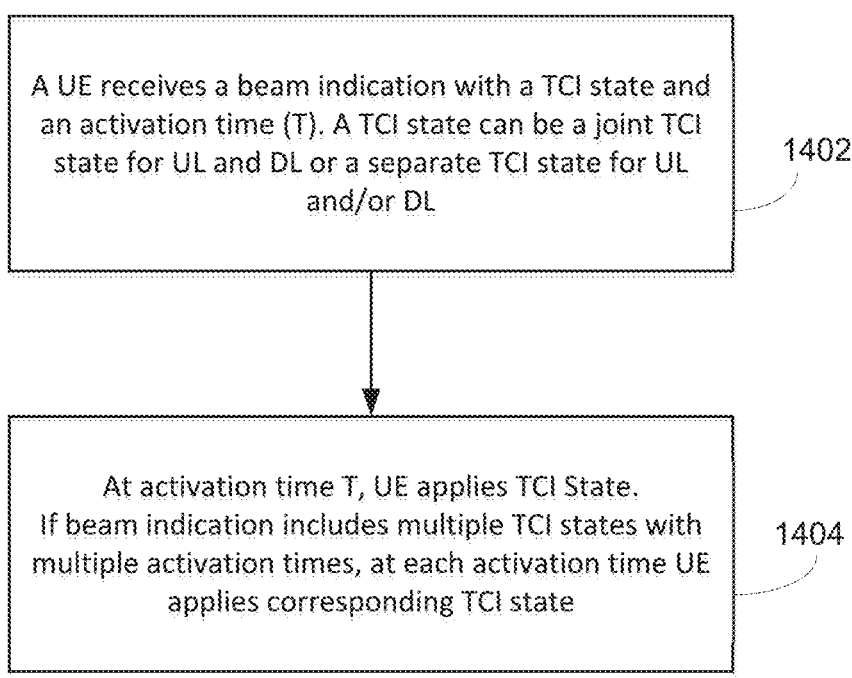
FIG. 14 illustrates a flowchart of a method for UE according to embodiments of the present disclosure.

FIG. 14 illustrates a flowchart of a method 1400 for UE according to embodiments of the present disclosure. For example, the method 1400 as may be performed by a UE (e.g., 111-116 as illustrated in FIG. 1). An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, the UE in step 1402 receives a beam indication with a TCI state and an activation time (T). A TCI state can be a joint TCI state for UL and DL or a separate TCI state for UL and/or DL. In step 1404, at activation time T, the UE applies TCI State. In step 1404, if beam indication includes multiple TCI states with multiple activation times, at each activation time UE applies corresponding TCI state.

FIG. 14 illustrates the procedure the UE applies when receiving a beam indication with a TCI state and an activation time. In step 1 (e.g., step 1402), a UE receives a beam indication with a TCI state and an activation time. The TCI state can be a joint TCI state (DL+UL TCI state), a separate TCI state (with a separate DL TCI state and a separate UL TCI state), a DL only TCI state or an UL only TCI state. In step 2 (e.g., step 1404), at the activation time, the signaled TCI state becomes active. The activation time can be relative to the time of reception of the beam indication (or acknowledgment), or an absolute time.

In another example 1.2, a UE is configured a set of beam indication IDs, wherein, a beam indication ID is associated with a set of order pairs, wherein an order pair includes a TCI state ID and a TCI state ID activation time as illustrated by way of example in TABLE 1. The set of beam indication IDs and the corresponding TCI state IDs, and activation time of the TCI state ID, can be configured and/or updated by RRC signaling and/or MAC CE signaling. In one further example, MAC CE signaling activates a subset of beam indication IDs as codepoints for beam indication IDs by DCI signaling and/or by MAC CE signaling.

TABLE 1

| Beam Indication ID | TCI State ID | TCI State ID Activation Time |
|---|---|---|
| Beam Indication ID 0 | TCI State ID0_0 | Time0_0 |
|  | TCI State ID0_1 | Time0_1 |
|  | ... | ... |
|  | TCI State ID0_(n − 1) | Time0_(n − 1) |
| Beam Indication ID 1 | TCI State ID1_0 | Time1_0 |
|  | TCI State ID1_1 | Time1_1 |
|  | ... | ... |
|  | TCI State ID1_(n − 1) | Time1_(n − 1) |
| ... | ... | ... |
| Beam Indication ID M − 1 | TCI State ID(M − 1)_0 | Time(M − 1)_0 |
|  | TCI State ID(M − 1)_1 | Time(M − 1)_1 |
|  | ... | ... |
|  | TCI State ID(M − 1)_(n − 1) | Time(M − 1)_(n − 1) |

In a variant of the example shown in TABLE 1, the number of TCI state order-pairs associated within each beam indication ID can be different, e.g., the number of TCI state order pairs for the beam indication 0 is $n_o$, the number of TCI state order pairs for beam indication 1 is $n_1$, ..., the number of TCI state order pairs for beam indication M−1 is $n_{M-1}$. This is illustrated in TABLE 2.

TABLE 2

| Beam Indication ID | TCI State ID | TCI State ID Activation Time |
|---|---|---|
| Beam Indication ID 0 | TCI State ID0_0 | Time0_0 |
| | TCI State ID0_1 | Time0_1 |
| | ... | ... |
| | TCI State ID0_($n_0$ − 1) | Time0_($n_0$ − 1) |
| Beam Indication ID 1 | TCI State ID1_0 | Time1_0 |
| | TCI State ID1_1 | Time1_1 |
| | ... | ... |
| | TCI State ID1_($n_1$ 1) | Time1_($n_1$ − 1) |
| ... | ... | ... |
| Beam Indication ID M − 1 | TCI State ID(M − 1)_0 | Time(M − 1)_0 |
| | TCI State ID(M − 1)_1 | Time(M − 1)_1 |
| | ... | ... |
| | TCI State ID(M − 1)_($n_{M-1}$ − 1) | Time(M − 1)_($n_{M-1}$ − 1) |

Figure 15:
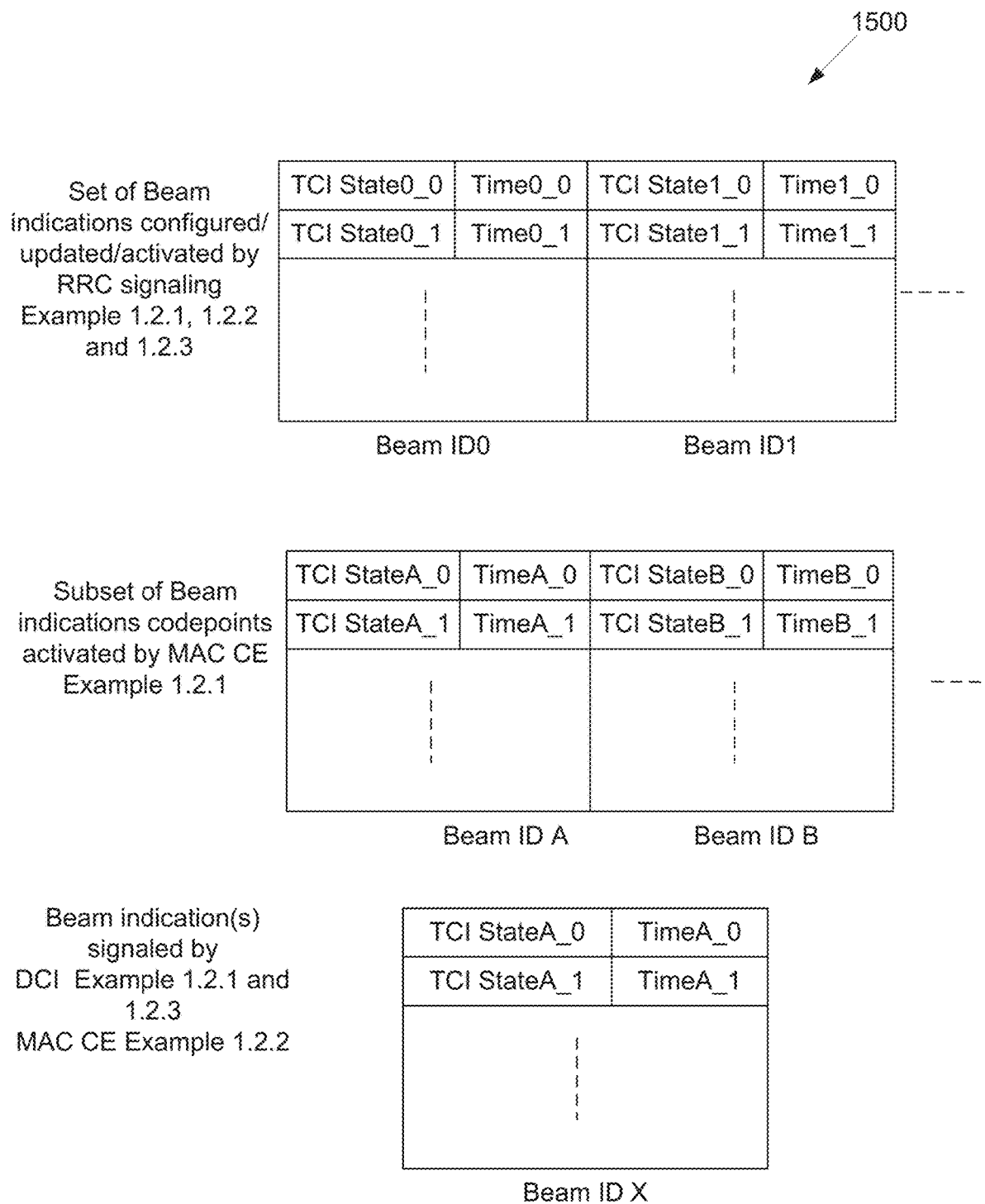
FIG. 15 illustrates an example of a set of beam indications according to embodiments of the present disclosure.

FIG. 15 illustrates an example of a set of beam indications 1500 according to embodiments of the present disclosure. An embodiment of the set of beam indications 1500 shown in FIG. 15 is for illustration only.

In one example 1.2.1 as illustrated in FIG. 15: (1) a set of beam indications is configured and/or updated and/or activated by RRC signaling as shown in TABLE 1 or TABLE 2, (2) a subset of beam indications is activated by MAC CE, wherein the subset set of beam indications are codepoints for further signaling; and (3) a codepoint(s) of beam indication(s) is signaled by L1 control (e.g., DCI). For example, the beam indications can be signaled by a DL-related DCI Format with or without a DL assignment (e.g. DCI Format 1_0 or DCI Format 1_1 or DCI Format 1_2), for example, by repurposing the "Transmission configuration indication" field. Alternatively, the beam indication can be signaled by an UL-related DCI Format with or without UL grant (e.g. DCI Format 0_0 or DCI Format 0_1 or DCI Format 0_2).

In another example 1.2.2 as illustrated in FIG. 15: (1) a set of beam indications is configured and/or updated and/or activated by RRC signaling as shown in TABLE 1 or TABLE 2 and (2) a beam indication(s) from the set of beam indications configured/updated/activated by RRC signaling is further signaled by MAC CE signaling.

In another example 1.2.3 as illustrated in FIG. 15: (1) a set of beam indications is configured and/or updated and/or activated by RRC signaling as shown in TABLE 1 or TABLE 2; and (2) a beam indication(s) from the set of beam indications configured/updated/activated by RRC signaling is further signaled by L1 control (DCI) signaling. For example, the beam indications can be signaled by a DL-related DCI Format with or without a DL assignment (e.g. DCI Format 1_0 or DCI Format 1_1 or DCI Format 1_2), for example, by repurposing the "Transmission configuration indication" field. Alternatively, the beam indication can be signaled by an UL-related DCI Format with or without UL grant (e.g. DCI Format 0_0 or DCI Format 0_1 or DCI Format 0_2).

In one example 1.3, an additional parameter X for time adjustment is signaled to the UE such that the time at which a beam indication i signaled to the UE, with a TCI state TCI and TCI state activation time $t_i$, becomes active is a function of X and $t_i$, i.e., TCI state activation time=$f(X,t_i)$. In one example the TCI state activation time is the product of X and $t_i$, i.e., TCI activation time=$X \cdot t_i$. In one example, the TCI state activation time can be the time of the TCI state activation relative to the time of the signaling of the beam indication or the acknowledgment of the beam indication signaling message. In another example, the TCI state activation time can be an absolute time reference, i.e., symbol number and/or slot number and/or subframe number and/or frame number.

In one example 1.3.1, (1) a set of time adjustment parameters {X} is configured and/or updated by RRC signaling; (2) a subset of time adjustment parameters {Xs} is selected by MAC CE from the set of time adjustment parameters configured/updated by RRC signaling; and (3) a time adjustment parameter X from the subset of time adjustment parameters {Xs} selected by MAC CE signaling is signaled to the UE with the beam indication(s) in L1 control (DCI) signaling.

In another example 1.3.2, (1) a set of time adjustment parameters {X} is configured and/or updated by RRC signaling; and (2) a time adjustment parameter X from the set of time adjustment parameters {X} configured/updated by RRC signaling is signaled to the UE with the beam indication(s) in MAC CE signaling.

In another example 1.3.3, (1) a set of time adjustment parameters {X} is configured and/or updated by RRC signaling; and (2) a time adjustment parameter X from the set of time adjustment parameters {X} configured/updated by RRC signaling is signaled to the UE with the beam indication(s) in L1 control (DCI) signaling.

Figure 16:
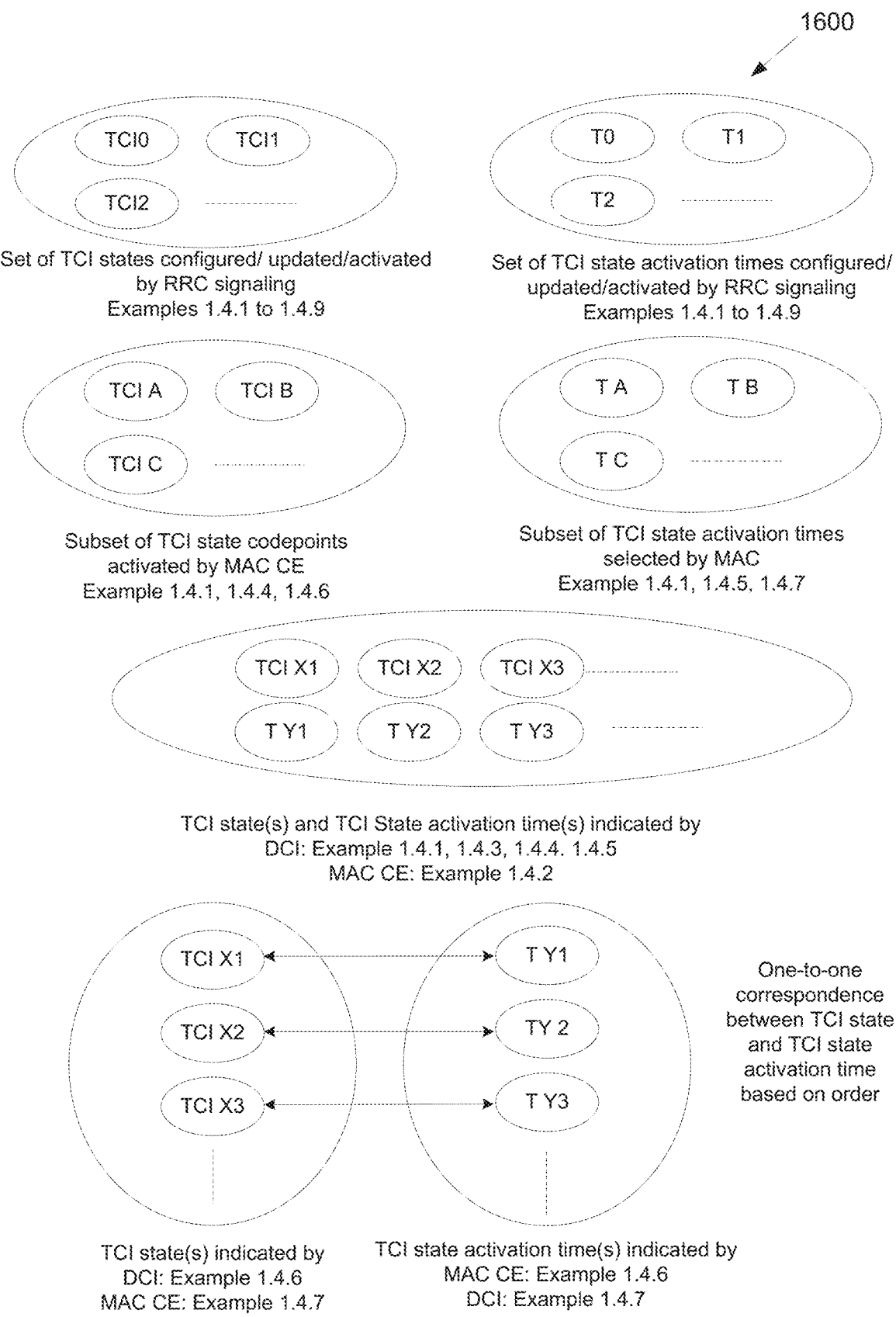
FIG. 16 illustrates an example of a set of TCI states according to embodiments of the present disclosure.

FIG. 16 illustrates an example of a set of TCI states 1600 according to embodiments of the present disclosure. An embodiment of the set of TCI states 1600 shown in FIG. 16 is for illustration only.

In another example 1.4, a UE is configured a set of TCI states with TCI state IDs and a set of TCI state activation times, a UE can be signaled one or more TCI states/TCI state IDs and one or more corresponding TCI state activation time. Wherein, the TCI state becomes activate at the corresponding TCI state activation time as illustrated in FIG. 16.

In one example, the TCI state activation time can be the time of the TCI state activation relative to the time of the signaling of the beam indication or the acknowledgment of the beam indication signaling message. In another example, the TCI state activation time can be an absolute time reference, i.e., symbol number and/or slot number and/or subframe number and/or frame number.

In one example 1.4.1, (1) a set of TCI states is configured and/or updated and/or activated by RRC signaling. A set of TCI state activation times is configured and/or updated by RRC signaling; (2) a subset of TCI states is activated by MAC CE signaling, wherein the subset of TCI states are codepoints for further signaling and/or a subset of TCI state activation times is selected by MAC CE signaling wherein the subset of TCI state activation times are codepoints for further signaling; and (3) codepoint(s) of TCI state and codepoint(s) of TCI state activation time(s) are signaled by L1 control (DCI) signaling.

In another example 1.4.2, (1) a set of TCI states is configured and/or updated and/or activated by RRC signaling. A set of TCI state activation times is configured and/or updated by RRC signaling; and (2) TCI state(s) from the set of TCI states configured/updated/activated by RRC signaling and TCI state activation time(s) from the set of TCI state activation times configured/updated by RRC signaling are signaled by MAC CE. For example, the MAC CE signaling can be order pairs of TCI state and TCI state activation time, wherein the TCI state is activated at the TCI state activation time in an order pair.

In another example 1.4.3, (1) a set of TCI states is configured and/or updated and/or activated by RRC signaling. A set of TCI state activation times is configured and/or updated by RRC signaling; and (2) TCI state(s) from the set of TCI states configured/updated/activated by RRC signaling and TCI state activation time(s) from the set of TCI state activation times configured/updated by RRC signaling are signaled by L1 control (DCI) signaling. For example, the DCI signaling can be order pairs of TCI state and TCI state activation time, wherein the TCI state is activated at the TCI state activation time in an order pair.

In another example 1.4.4, (1) a set of TCI states is configured and/or updated and/or activated by RRC signaling. A set of TCI state activation times is configured and/or updated by RRC signaling; (2) a subset of TCI states is activated by MAC CE signaling, wherein the subset set of TCI states are codepoints for further signaling; and (3) codepoint(s) of TCI state and TCI state activation time(s) from the set of TCI state activation times configured/updated by RRC signaling are signaled by L1 control (DCI) signaling.

In another example 1.4.5, (1) a set of TCI states is configured and/or updated and/or activated by RRC signaling. A set of TCI state activation times is configured and/or updated by RRC signaling; (2) a subset of TCI state activation times is selected by MAC CE signaling, wherein the subset of TCI state activation times are codepoints for further signaling; and (3) TCI state(s) from the set of TCI states configured/updated/activated by RRC signaling and TCI state activation time codepoint(s) are signaled by L1 control (DCI) signaling.

In another example 1.4.6, (1) a set of TCI states is configured and/or updated and/or activated by RRC signaling. A set of TCI state activation times is configured and/or updated by RRC signaling; (2) a subset of TCI states is selected by MAC CE signaling, wherein the subset of TCI states are codepoints for further signaling; (3) TCI state activation time(s) from the set of TCI state activation times configured/updated/activated by RRC signaling are signaled by MAC CE signaling, wherein the TCI state activation time(s) are in order; and (4) codepoint(s) of TCI state are signaled by L1 control (DCI) signaling, wherein the signaled codepoint(s) of TCI state are in order and there is a correspondence between a TCI state codepoint in a DCI and TCI state activation time in MAC CE based on order.

In another example 1.4.7, the same as example 1.4.6, but with MAC CE signaling of a TCI state(s) and MAC CE activation and DCI signaling of a TCI state activation time(s).

In another example 1.4.8, the same as example 1.4.6, but with DCI signaling of the TCI state activation time(s).

In another example 1.4.9, the same as example 1.4.6, but with MAC CE signaling of a TCI state(s) and possibly with no MAC CE activation of TCI state code points.

In another example 1.4.10, a set of TCI states is configured by RRC in order $\{TCI_0, TCI_1, TCI_2, \ldots, TCI_{N-1}\}$. Alternatively, a set of TCI states is configured by RRC and subset of the TCI states is further activated by MAC CE, wherein the subset of TCI states activated by MAC CE is in order $\{TCI_0, TCI_1, TCI_2, \ldots, TCI_{N-1}\}$. A UE is indicated a TCI state TCL by MAC CE signaling and/or L1 control (DCI) signaling. A UE is further configured or a indicated by RRC signaling and/or MAC CE signaling and/or L1 control (DCI) signaling a number n of consecutive TCI states to apply, wherein the TCI states applied are in the following order $TCI_i, TCI_{i+1}, TCI_{i+2}, \ldots TCi_{i+n-1}$. The activation time for each TCI state is further configured by RRC signaling and/or MAC CE signaling and/or L1 control DCI signaling.

In another example 1.5, a UE is configured a set of beam indication IDs, wherein, a beam indication ID includes a group of TCI state IDs as illustrated by way of example in TABLE 3. A UE applies the TCI states according to the order in a group of TCI state IDs, i.e., if beam indication ID0 is indicated to a UE, a UE first applies TCI state ID0_0, then applies TCI state ID0_1 and so on. The set of beam indication IDs and the corresponding TCI state IDs can be configured and/or updated by RRC signaling and/or MAC CE signaling. In one further example, MAC CE signaling activates a subset of beam indication IDs as codepoints for beam indication IDs by DCI signaling and/or by MAC CE signaling.

A UE is further configured a set of beam indication timing IDs, wherein, a beam indication timing ID includes a group of TCI state activation times as illustrated by way of example in TABLE 4. The set of beam indication timing IDs and corresponding TCI state activation times can be configured and/or updated by RRC signaling and/or MAC CE signaling.

In one further example, MAC CE signaling activates a subset of beam indication timing IDs as codepoints for beam indication times IDs by DCI signaling and/or by MAC CE signaling. A UE is indicated a beam indication ID and a beam indication timing ID and a UE applies a TCI state in the beam indication ID at the time indicated by the corresponding TCI state activation time in the indicated beam indication timing ID.

TABLE 3

| Beam Indication ID | TCI State ID |
|---|---|
| Beam Indication ID 0 | TCI State ID0_0 |
|  | TCI State ID0_1 |
|  | . . . |
|  | TCI State ID0_(n − 1) |
| Beam Indication ID 1 | TCI State ID1_0 |
|  | TCI State ID1_1 |
|  | . . . |
|  | TCI State ID1_(n − 1) |
| . . . | . . . |
| Beam Indication ID M − 1 | TCI State ID(M − 1)_0 |
|  | TCI State ID(M − 1)_1 |
|  | . . . |
|  | TCI State ID(M − 1)_(n − 1) |

TABLE 4

| Beam Indication ID | TCI State ID Activation Time |
|---|---|
| Beam Indication Timing ID 0 | Time0_0 |
| | Time0_1 |
| | ... |
| | Time0_(n − 1) |
| Beam Indication Timing ID 1 | Time1_0 |
| | Time1_1 |
| | ... |
| | Time1_(n − 1) |
| ... | ... |
| Beam Indication Timing ID M − 1 | Time(M − 1)_0 |
| | Time(M − 1)_1 |
| | ... |
| | Time(M − 1)_(n − 1) |

In a variant of the example shown in TABLE 3, the number of TCI state IDs associated with each beam indication ID or beam indication timing ID can be different, e.g., the number of TCI state IDs for the beam indication 0 is $n_0$, the number of TCI state IDs for beam indication 1 is $n_1, \ldots$, the number of TCI state IDs for beam indication M−1 is $n_{M-1}$. This is illustrated in TABLE 5.

Similarly, the number of TCI state activation times for the beam indication timing 0 is $k_0$, the number of TCI state activation times for beam indication 1 is $k_1, \ldots$, the number of TCI state activation times for beam indication M−1 is $k_{M-1}$. This is illustrated in TABLE 6. In one example, $k_0=n_0$, $k_1=n_1, \ldots, k_{M-1}=n_{M-1}$.

TABLE 5

| Beam Indication ID | TCI State ID |
|---|---|
| Beam Indication ID 0 | TCI State ID0_0 |
| | TCI State ID0_1 |
| | ... |
| | TCI State ID0_($n_0$ − 1) |
| Beam Indication ID 1 | TCI State ID1_0 |
| | TCI State ID1_1 |
| | ... |
| | TCI State ID1_($n_1$ − 1) |
| ... | ... |
| Beam Indication ID M − 1 | TCI State ID(M − 1)_0 |
| | TCI State ID(M − 1)_1 |
| | ... |
| | TCI State ID(M − 1)_($n_{M-1}$ − 1) |

TABLE 6

| Beam Indication ID | TCI State ID Activation Time |
|---|---|
| Beam Indication Timing ID 0 | Time0_0 |
| | Time0_1 |
| | ... |
| | Time0_($k_0$ − 1) |
| Beam Indication Timing ID 1 | Time1_0 |
| | Time1_1 |
| | ... |
| | Time1_($k_1$ − 1) |
| ... | ... |
| Beam Indication Timing ID M − 1 | Time(M − 1)_0 |
| | Time(M − 1)_1 |
| | ... |
| | Time(M − 1)_($k_{M-1}$ − 1) |

In one example 1.5.1, a set of TCI beam indications is configured and/or updated and/or activated by RRC signaling as shown in TABLE 3 or TABLE 5. A set of beam indication timings is configured and/or updated by RRC signaling as shown in TABLE 4 or TABLE 6.

A subset of beam indications is activated by MAC CE signaling, wherein the subset set of beam indications are codepoints for further signaling and/or a subset of beam indication times is selected by MAC CE signaling wherein the subset set of beam indication times are codepoints for further signaling.

Codepoint(s) of beam indications and codepoint(s) of beam indication timings are signaled by L1 control (DCI) signaling.

In another example 1.5.2, (1) a set of TCI beam indications is configured and/or updated and/or activated by RRC signaling as shown in TABLE 3 and TABLE 5. A set of beam indication timings is configured and/or updated by RRC signaling as shown in TABLE 4 and TABLE 6.

Beam indication(s) from the set of beam indications configured/updated/activated by RRC signaling and beam indication timing(s) from the set of beam indication timings configured/updated by RRC signaling are signaled by MAC CE.

In another example 1.5.3, (1) a set of TCI beam indications is configured and/or updated and/or activated by RRC signaling as shown in TABLE 3 and TABLE 5. A set of beam indication timings is configured and/or updated by RRC signaling as shown in TABLE 4 and TABLE 6.

Beam indication(s) from the set of beam indications configured/updated/activated by RRC signaling and beam indication timing(s) from the set of beam indication timings configured/updated by RRC signaling are signaled by L1 control (DCI) signaling.

In another example 1.5.4, (1) a set of TCI beam indications is configured and/or updated and/or activated by RRC signaling as shown in TABLE 3 and TABLE 5. A set of beam indication timings is configured and/or updated by RRC signaling as shown in TABLE 4 and TABLE 6.

A subset of beam indications is activated by MAC CE signaling, wherein the subset of beam indications are codepoints for further signaling.

Codepoint(s) of beam indications and beam indication timing(s) from the set of beam indication timings configured/updated by RRC signaling are signaled by L1 control (DCI) signaling.

In another example 1.5.5, (1) a set of TCI beam indications is configured and/or updated and/or activated by RRC signaling as shown in TABLE 3 and TABLE 5. A set of beam indication timings is configured and/or updated by RRC signaling as shown in TABLE 4 and TABLE 6.

A subset of beam indication timings is selected by MAC CE signaling, wherein the subset of beam indication timings are codepoints for further signaling.

Beam indication(s) from the set of beam indications configured/updated/activated by RRC signaling and beam indication timing codepoint(s) are signaled by L1 control (DCI) signaling.

In another example 1.5.6, (1) a set of TCI beam indications is configured and/or updated and/or activated by RRC signaling as shown in TABLE 3 and TABLE 5. A set of beam indication timings is configured and/or updated by RRC signaling as shown in TABLE 4 and TABLE 6.

A subset of beam indications is selected by MAC CE signaling, wherein the subset set of beam indications are codepoints for further signaling.

Beam indication timing(s) from the set of beam indication timings configured/updated by RRC signaling are signaled by MAC CE signaling, wherein the beam indication timing(s) are in order.

Codepoint(s) of beam indication are signaled by L1 control (DCI) signaling, wherein the signaled codepoint(s) of beam indication are in order and there is a correspondence between a beam indication codepoint in a DCI and a beam indication timing in MAC CE based on order.

In another example 1.5.7, the same as example 1.5.6, but with MAC CE signaling of a beam indication(s) and MAC CE activation and DCI signaling of a beam indication timing(s)

In another example 1.5.8, the same as example 1.5.6, but with DCI signaling of the beam indication timing(s).

In another example 1.5.9, the same as example 1.5.6, but with MAC CE signaling of a beam indication(s) and possibly with no MAC CE activation of beam indication code points.

In another example 1.5.10, and following the sub-examples of example 1.5, an additional parameter X for time adjustment is signaled to the UE such the time as which a beam indication i signaled to the UE, with a TCI state $TCI_i$ and a corresponding TCI state activation time $t_i$, becomes active is a function of X and $t_i$, i.e., TCI state activation time=$f(X,t_i)$. The various sub-examples of example 1.3, can apply here.

In a further example 1.6, a UE can be indicated multiple (e.g., 2) beam indication IDs according to the previous examples. A UE can autonomously select a beam indication ID for determining the TCI state for future time instances. For example, the UE's selection of a beam indication ID can be to meet a maximum permissible exposure (MPE) requirement, for power saving reasons, or other reasons as determined by the UE and/or configured by the network.

In various embodiments for component 2, in a wireless communication system, the multi-path environment changes in the spatial domain and the temporal domain as a UE moves from one point to the next and as time elapses. As described in FIG. 8, FIG. 9, FIG. 10, and FIG. 11, in a typical beam management scheme, a network triggers the transmission of a reference signal for beam measurement, a UE or gNB measures the multi-paths of the wireless channel, for example based on reference signals transmitted by a gNB (e.g., CSI-RS and/or SSB) or by a UE (e.g., SRS) respectively. In case of a measurement at the UE, the UE provides a beam measurement report to the gNB, and gNB determines a suitable multi-path and signals a corresponding beam ID (for example a TCI state ID, or an SRS resource indicator or a spatial relation information), that allows the UE to determine a spatial filter for downlink reception and a spatial filter for uplink transmission.

This procedure is a reactive procedure, meaning that the UE or gNB waits for the multi-path to appear, before performing the beam measurement, and reports the beam measurements to the network, and then the network can determine and select a suitable beam to use and indicate corresponding ID to the UE. This procedure can take 10's of milli-seconds and even longer rendering it not feasible for a fast changing multi-path wireless channel. By the time a beam is indicated to a UE, it would become obsolete or near obsolete and is no longer the most suitable beam to use and a new measurement needs to be performed.

Figure 17:
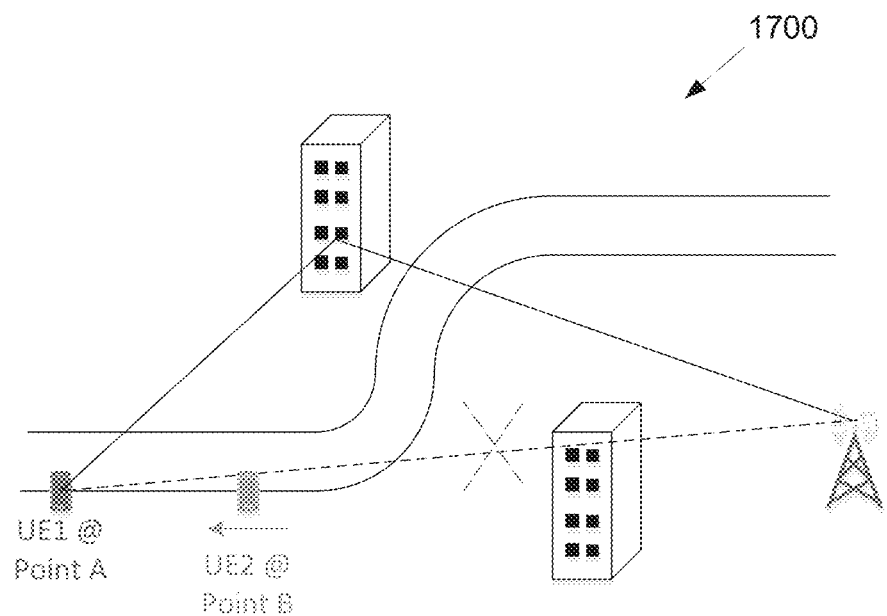
FIG. 17 illustrates an example of beam measurement reporting according to embodiments of the present disclosure.

FIG. 17 illustrates an example of beam measurement reporting 1700 according to embodiments of the present disclosure. An embodiment of the beam measurement reporting 1700 shown in FIG. 17 is for illustration only.

The present disclosure provides the network learning operation about the best (most suitable) beam(s) to use at each spatial location based on reports from earlier users passing by a spatial location. To achieve this, beam management is assisted by positioning, when a user provides a beam measurement report, the UE can provide the position and the time at which the beam measurement report was made and possibly the velocity or speed.

For example, in FIG. 17, a UE 1 is passing by point A. The UE 1 provides a beam measurement report when measured at point A.

Figure 18:
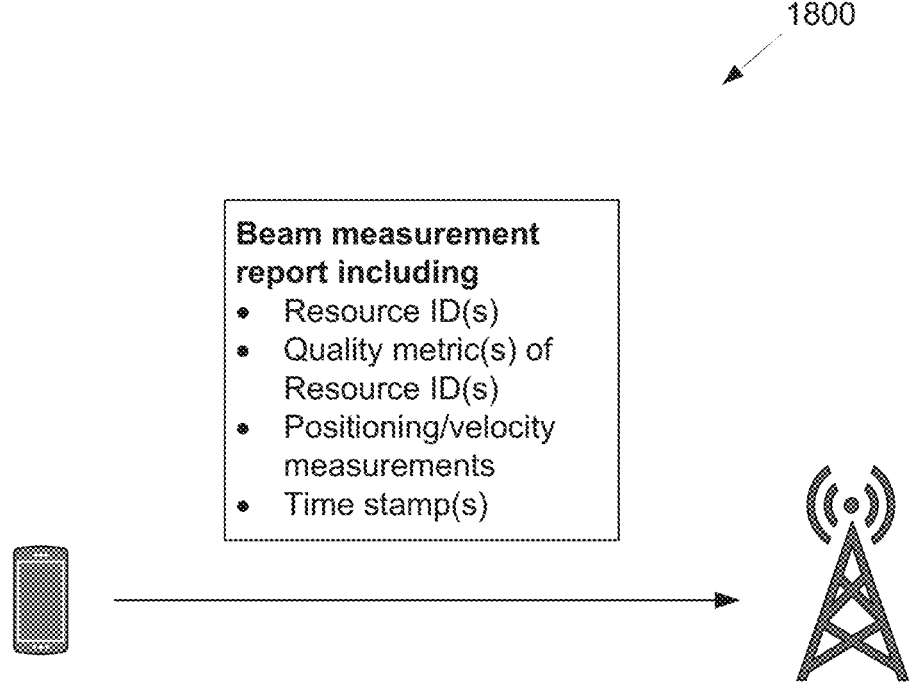
FIG. 18 illustrates an example of contents of beam measurement reporting according to embodiments of the present disclosure.

FIG. 18 illustrates an example of contents of beam measurement reporting 1800 according to embodiments of the present disclosure. An embodiment of the contents of beam measurement reporting 1800 shown in FIG. 18 is for illustration only.

In one example 2.1 (FIG. 18), the beam measurement report can include following examples.

In one example, a resource ID(s) associated with the beam is included, for example, (i) a CSI-RS resource indicator (CRI); and/or (ii) a synchronization signal/physical broadcast channel (PBCH) block (SSB) resource indicator (SSBRI).

In one example, a beam quality metric measurement(s) for the resource ID(s) is included, wherein the measurement can include L1-RSRP, L1-SINR, channel quality indicator (CQI), block error rate (BLER) or some other beam quality metric.

In one example, the position, e.g., latitude, longitude and altitude at which measurement was made is included. If multiple measurements are made at different times, a position for each measurement can be included. In one example, the determined position (e.g., latitude and/or longitude and/or elevation) is included in the report. In another example, the positioning measurements are included in the report. In another example, a combination of the determined position and positioning measurements is included in the report.

In one example, optionally, the velocity or speed of the UE is included. In one example, the determined velocity is included in the report. In another example, the velocity measurements are included in the report. In another example, a combination of the determined velocity and velocity measurements is included in the report.

In one example, optionally the beam measurement report can include the time(s) of the beam measurement(s), where the time of the beam measurement can be in symbol, slot, subframe, frame or in units of time (e.g., milli-second). The time can be a relative time, e.g., relative to the time of sending the beam measurement report or an absolute time.

In one example 2.1.1, the position of the UE can be determined based on the position reference signal(s) PRS measurements at the UE. Positioning PRS measurements, can include DL-PRS-RSRP and/or DL-PRS-RSTD and/or UE RX-TX time difference measurements.

In another example 2.1.2, the position of the UE can be determined by non-RAT schemes such as global navigation satellite system (GNSS), and using sensors on the device such as accelerometers, magnetometers and gyroscopes.

In another example 2.1.3, the position of the UE can be determined by RAT-based schemes such as PRS measurements as described in example 2.1.1, and non-RAT based schemes as described in example 2.1.2.

In another example 2.1.4, the UE can determine the velocity or speed of the UE using RAT-based schemes (e.g., PRS or Doppler Shift measurements) and/or using non-RAT based schemes as described in example 2.1.2.

In another example 2.1.5 (e.g., as illustrated in FIG. 18), a beam measurement report can include: (1) a resource ID(s); (2) a beam quality metric(s) for the resource ID(s); (3) DL positioning measurements such as PRS measurements (e.g. DL-PRS-RSRP measurements, DL RSTD (downlink reference signal time difference) measurements, UE RX-TX time difference measurements etc.); (4) Doppler frequency shift of downlink reference signals (e.g., SSB and/or CSI-RS and/or PRS). The reference signals can be from serving cells or from non-serving cells; and/or (5) the time(s) of the beam measurements, and/or DL positioning measurements, and/or Doppler frequency shift measurements.

Figure 19:
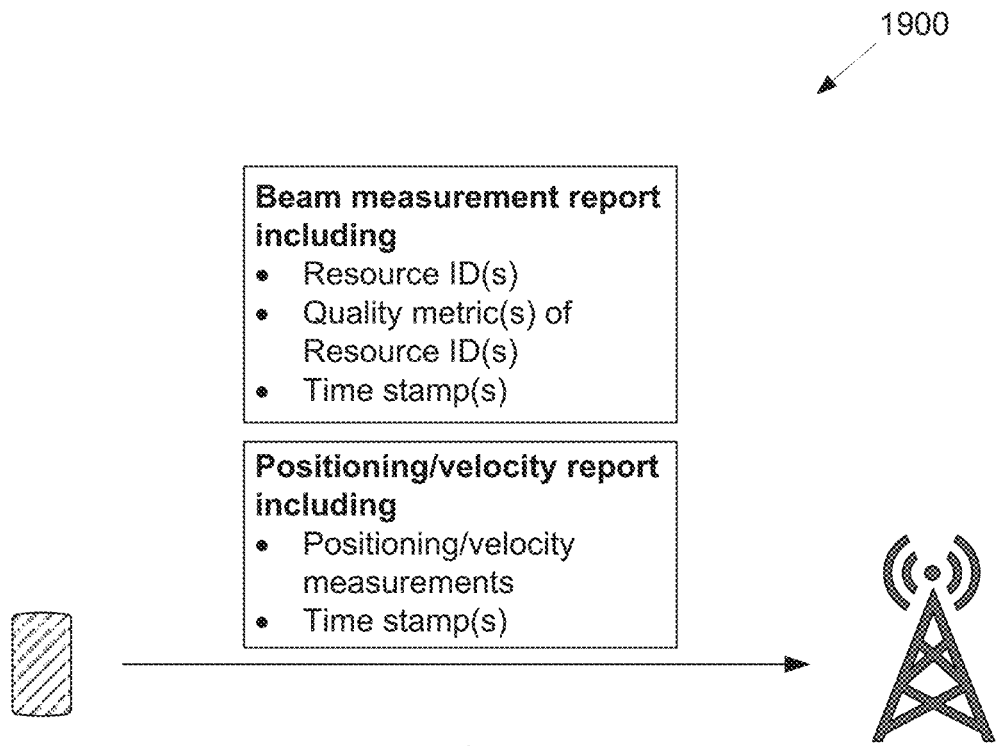
FIG. 19 illustrates an example of contents of beam measurement reporting and positioning/velocity reporting according to embodiments of the present disclosure.

FIG. 19 illustrates an example of contents of beam measurement reporting and positioning/velocity reporting 1900 according to embodiments of the present disclosure. An embodiment of the contents of beam measurement reporting and positioning/velocity reporting 1900 shown in FIG. 19 is for illustration only.

In another example 2.1.6 (e.g., as illustrated in FIG. 19), the beam measurement report and positioning/velocity report can be included in separate UL transmissions, each with a time stamp. Alternatively, a beam measurement report and a positioning report can indicate a measurement at a same or similar time instance. Alternatively, a time-stamp is not included in the beam measurement report, the time of beam measurement is determined based on the time of transmission of beam measurement report (e.g., before the beam measurement report by a configured time or a system specified time).

In one example 2.1.7, the beam measurement report with positioning information and optionally timing information can be included in L1 UL control information (UCI) and/or in MAC CE. L1 UCI can be sent on PUCCH or PUSCH.

In another example 2.1.8, the separate positioning report and beam measurement report can each be included in L1 UL control information (UCI) and/or in MAC CE. L1 UCI can be sent on PUCCH or PUSCH.

After the network receives a beam measurement report from a UE passing by point A, the network stores the beam measurement report for point A. It is worth mentioning that a UE could receive several beam measurement reports for point A form the same UE or from different UEs passing by point A at different times. The reports could be different due to the temporal variation of the channel. In this case, the network can extrapolate the multi-path environment at point A form prior measurements. In one example, the network can use the most recent multi-path measurement for point A. In another example, the network can use its own implementation to determine a multi-path at a future point in time (for example based on artificial intelligence schemes).

In FIG. 17, a second UE, a UE2, is about to pass by point A. The network can determine that the UE 2 is about to pass by point A if the UE2 reports the UE's speed and velocity at time t1, which indicates a trajectory passing by point A at time t2. The network, accordingly, signals a UE to use a TCI state based on an earlier measurement from a UE 1 at time t2 following one of the examples of component 1.

The UE 2 can also provide beam measurement reports with positioning information (e.g., resource ID, beam quality metric for resource ID and position/velocity/time of beam measurement or positioning/velocity measurements corresponding to beam measurement) or separate beam measurement reports and positioning/velocity reports to the network that allow the network to: (1) update a spatial multi-path wireless channel for the benefit of future UEs passing by the point of beam report measurement; and (2) the network can determine a change in channel conditions at point B to better estimate the channel at future point A.

In one example 2.2, a UE can report one or more of the following measurements.

In one example, the position of the UE, e.g., latitude, longitude and possibly elevation is reported. The position of the UE can be determined based on the positioning reference signal(s) PRS measurements at the UE, or non-RAT schemes as describe in example 2.1.2, or the combination of RAT and non-RAT based positioning schemes. Alternatively, a UE may provide DL positioning measurements such as PRS measurements (e.g., DL-PRS-RSRP measurements, DL RSTD (downlink reference signal time difference) measurements, UE RX-TX time difference measurements, etc.)

In one example, the velocity of the UE, e.g., the speed of the UE and the direction of motion, is reported. Alternatively, measurements related to the velocity (e.g., Doppler Shift and/or Doppler Spread) are reported.

In one example, the time at which the position and/or speed measurement was made is reported.

Figure 20:
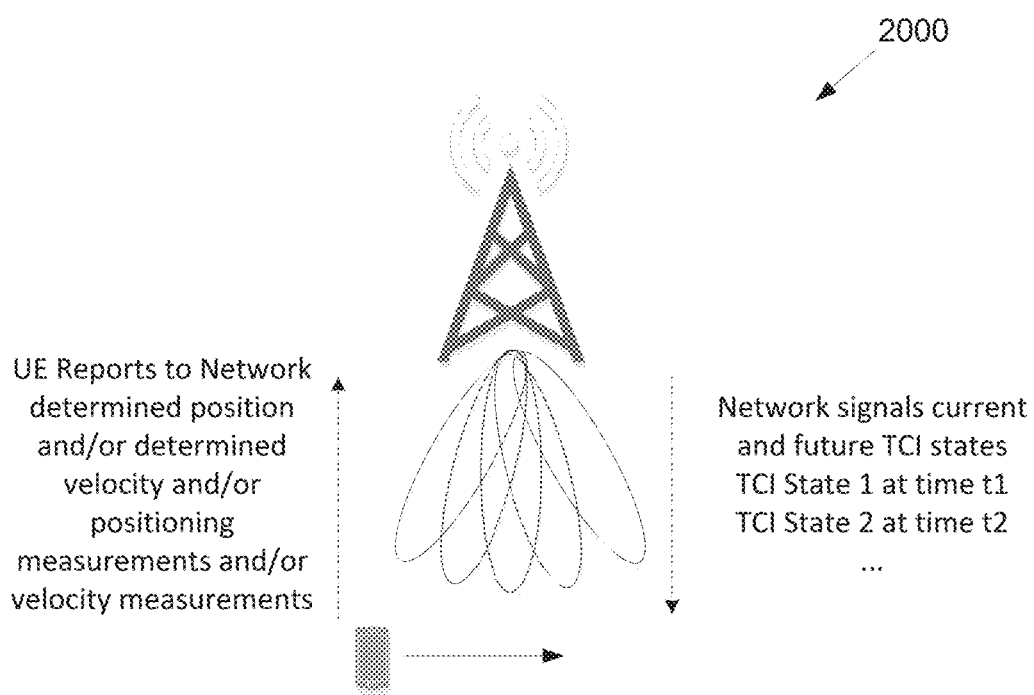
FIG. 20 illustrates an example of UE reporting and network signaling according to embodiments of the present disclosure.

Based on the current position and speed (or velocity) of a UE, the network can predict the trajectory of the UE in the near term, and accordingly signal one or more TCI states to be used in the future along with the activation time of the TCI state(s) as illustrated in FIG. 20.

FIG. 20 illustrates an example of UE reporting and network signaling 2000 according to embodiments of the present disclosure. An embodiment of the UE reporting and network signaling 2000 shown in FIG. 20 is for illustration only.

In a further example 2.3, a UE can report a UE type for example a make and model of a UE that can be associated with a special characteristic of a UE for example the number of panels in the UE, the relative orientation of the panels, the antenna array configuration of the panels etc. The network can use the UE type in addition to the beam measurement report when determining a future TCI state for a UE. For example, a future TCI state can be based on a beam measurement report from a UE of a same type that is passing by a same point.

In a further example 2.4, a UE can report the UE's orientation at the time of beam measurement and/or at the time of position/velocity measurement.

In another example 2.5, a network can configure/update a UE by RRC signaling and/or MAC CE signaling and/or L1 control signaling to report beam measurements and/or position/velocity measurements. Wherein, the measurement reports can be periodic and/or semi-persistence and/or aperiodic. These reports can assist the network in determining a spatial map of the multi-path wireless channel.

In one example 2.5.1, a UE can report the UE's power capability or power status. The network can be configured to transmit beam measurement reports and/or positioning/velocity measurement reports and/or reports of UE determined position/velocity according to the UE's power capability or the UE's power status. For example, a high energy UE can be configured to report beam and/or positioning/velocity measurements and/or reports of UE determined position/velocity more frequently than a low energy UE. A UE in a low power mode, for example due to a low battery or overheating, can have beam measurement reports disabled or reported less frequently.

In another example 2.5.2, a network can configure beam measurement reports based on the availability and accuracy of a spatial map of the multi-path wireless channel.

In another example 2.5.3, a UE with limited energy or running in low power mode, can autonomously reduce a beam reporting rate or stop reporting beam/position measurements and/or reports of UE determined position/velocity.

In another example 2.5.4, a UE with limited energy or running in low power mode, can request the network to reduce a beam reporting rate.

Figure 21:
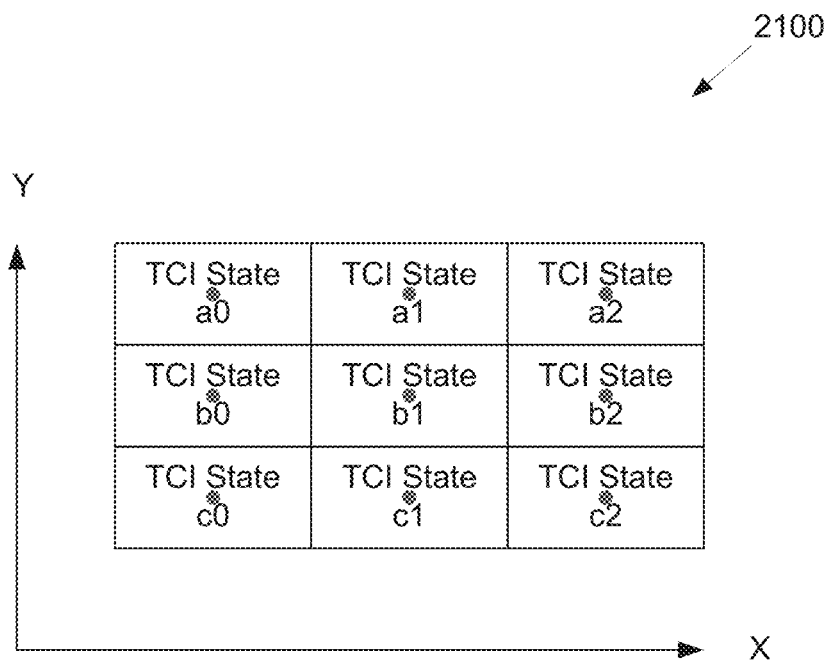
FIG. 21 illustrates an example of TCI states associated with a position according to embodiments of the present disclosure.

In one example 3.1 of Component 3, a network can configure a linkage between a UE's position and a TCI state or spatial relation as shown in FIG. 21.

FIG. 21 illustrates an example of TCI states associated with a position 2100 according to embodiments of the present disclosure. An embodiment of the TCI states 2100 shown in FIG. 21 is for illustration only.

In one example 3.1.1, (e.g., as illustrated in FIG. 21) a TCI state (or TCI state ID) or spatial relation is associated with or linked to a position as shown in TABLE 7. A UE at any position (X, Y), finds the closest point $(X_T, Y_T)$ for which a TCI state or spatial relation is provided and associates position (X, Y), with the corresponding TCI state or spatial relation. The association, linkage or mapping of TCI states (or TCI state IDs) or spatial relation to a position (e.g., $(X_T, Y_T)$), can be configured or updated by RRC signaling and/or MAC CE signaling.

In another example 3.1.2, a TCI state (or TCI state ID) or spatial relation is associated with or linked to a position in 3D. A UE at any position (X, Y, Z), finds the closest point $(X_T, Y_T, Z_T)$ for which a TCI state or spatial relation is provided and associates position (X, Y, Z), with the corresponding TCI state or spatial relation. The association, linkage or mapping of TCI states (or TCI state IDs) to a position (e.g., $(X_T, Y_T, Z_T)$), can be configured or updated by RRC signaling and/or MAC CE signaling.

TABLE 7

| TCI State | Position XT | Position YT |
|---|---|---|
| T1 | X1 | Y1 |
| T2 | X2 | Y2 |
| T3 | X3 | Y3 |

In another example 3.2, a network can configure a linkage between PRS beam measurements (e.g., DL-PRS-RSRP and/or DL-PRS-RSTD and/or UE RX-TX time difference measurements) and a TCI state (or TCI state ID) or spatial relation as shown in TABLE 8. In one example, a TCI state (or TCI state ID) or spatial relation is associated with a PRS profile (e.g., DL-PRS-RSRP and/or DL-PRS-RSTD and/or UE RX-TX time difference measurement profile). For example, a PRS profile includes a strongest PRS $P_1$, a second strongest PRS $P_2$, with a relative beam metric to $P_1$ of value $r_2$, a third strongest PRS $P_3$, with a relative beam metric to $P_1$ of value $r_3$, . . . . Wherein, the relative beam metrics can be the ratio between the RSRP or the SINR of the corresponding PRS and that of the strongest PRS in dB or in absolute value. For example, $r_i = RSRP_i/RSRP_1$ Or $r_i = RSRP\_dB_i - RSRP\_dB_1$.

A UE that measures a PRS profile PP finds a closet PRS profile $PP_T$, for which a TCI state (or TCI state ID) or spatial relation is provided and associates PRS profile PP, with the corresponding TCI state (or TCI state ID) or spatial relation. In one example, finding the closet PRS profile can proceed in order of the strongest PRS, e.g., finding the closet PRS profile based on the strongest PRS, if multiple PRS profiles are found proceeding to the second strongest PRS to find the closet PRS profile within the multiple PRS profiles found and so on. PRS profile PP is associated with the corresponding TCI state. The association, linkage or mapping of TCI states (or TCI state IDs) or spatial relation to a positioning measurement profile or PRS profile (e.g., $PP_T$), can be configured or updated by RRC signaling and/or MAC CE signaling.

TABLE 8

| | PRS Profile | | | | |
|---|---|---|---|---|---|
| TCI State | P1 | P2 | r2 | P3 | r3 |
| T1 | P1_1 | — | — | — | — |
| T2 | P2_1 | P2_2 | r2_2 | — | — |
| T3 | P3_1 | P3_2 | r3_2 | P3_3 | r3_3 |

In one example 3.3, a UE can report to the network the UE's (current or future) position (X, Y) in a positioning measurement report. A UE uses the TCI State (or TCI state ID) or Spatial Relation T associated or linked with (X, Y) (example 3.1.1) after a period Δ from the time of the positioning measurement report. Wherein, Δ can be configured and/or updated by RRC signaling and/or by MAC CE signaling. In another example Δ can be included in a positioning measurement report.

In another example 3.4, a UE can report to the network PRS measurements in a positioning measurement report. Wherein, PRS measurements can be for example RSRP of a PRS and/or SINR of a PRS and/or DL-PRS-RSTD and/or UE RX-TX time difference measurements. A UE uses the TCI State (or TCI state ID) or Spatial Relation T associated or linked with PRS profile PP (example 3.2) after a period Δ from the time of the positioning measurement report. Wherein, Δ can be configured and/or updated by RRC signaling and/or by MAC CE signaling. In another example Δ can be included in a positioning measurement report.

In another example 3.5, a network can configure a linkage or association or mapping between a UE's position and velocity or speed and a TCI state (or TCI state ID) or spatial relation. The linkage or association or mapping can be configured or updated by RRC signaling and/or MAC CE signaling.

In one example 3.5.1, a TCI state (or TCI state ID) or spatial relation is associated with or linked to a position and velocity as shown in TABLE 9. A UE at any position (X, Y), and with velocity $(V_x, V_y)$, finds the closest point $(X_T, Y_T)$ for which a TCI state (or TCI state ID) or spatial relation is provided, and for the closest point found $(X_T, Y_T)$, finds the corresponding closest velocity vector $(V_{Tx}, V_{Ty})$ for which a TCI state (or TCI state ID) or spatial relation is provided, and associates position (X, Y) and velocity $(V_x, V_y)$, with the corresponding TCI state (or TCI state ID) or spatial relation. The association, linkage or mapping of TCI states (or TCI state IDs) or spatial relation to a position (e.g., $(X_T, Y_T)$) and velocity (e.g., $(V_{Tx}, V_{Ty})$), can be configured or updated by RRC signaling and/or MAC CE signaling.

In a variant of example 3.5.1, a speed (rather than velocity) can be used for the linkage or association with a TCI state (or TCI state ID).

In one example 3.5.2, a TCI state (or TCI state ID) or spatial relation is associated with or linked to a position and velocity in 3D. A UE at any position (X, Y, Z), and with velocity $(V_x, V_y, V_z)$, finds the closest point $(X_T, Y_T, Z_T)$ for which a TCI state (or TCI state ID) or spatial relation is provided, and for the closest point found $(X_T, Y_T, Z_T)$, finds the corresponding closest velocity vector $(V_{Tx}, V_{Ty}, V_{Tz})$ for which a TCI state (or TCI state ID) or spatial relation is provided, and associates position (X, Y, Z) and velocity $(V_x, V_y, V_z)$, with the corresponding TCI state (or TCI state ID) or spatial relation. The association, linkage or mapping of TCI states (or TCI state IDs) to a position (e.g., $(X_T, Y_T, Z_T)$) and velocity (e.g., $(V_{Tx}, V_{Ty}, V_{Tz})$), can be configured or updated by RRC signaling and/or MAC CE signaling.

In a variant of example 3.5.2, a speed (rather than velocity) can be used for the linkage or association with a TCI state (or TCI state ID).

TABLE 9

| TCI State | Position XT | Position YT | Velocity VTx | Velocity VTy |
|---|---|---|---|---|
| T1 | X1 | Y1 | Vx1 | Vy1 |
| T2 | X2 | Y2 | Vx2 | Vy2 |
| T3 | X3 | Y3 | Vx3 | Vy3 |

In another example 3.6, a network can configure a linkage between PRS beam measurements (e.g., DL-PRS-RSRP and/or DL-PRS-RSTD and/or UE RX-TX time difference measurements) and a velocity or speed measurement or a velocity or speed-related measurement (e.g., Doppler Shift and/or Doppler Spread) and a TCI state (or TCI state ID) or spatial relation as shown in TABLE 10. In one example, a TCI state (or TCI state ID) or spatial relation is associated with a PRS profile (e.g., DL-PRS-RSRP and/or DL-PRS-RSTD and/or UE RX-TX time difference measurement profile) and a UE velocity or a UE velocity-related measurement (e.g., Doppler Shift and/or Doppler Spread). For example, a PRS profile includes a strongest PRS $P_1$, a second strongest PRS $P_2$, with a relative beam metric to $P_1$ of value $r_2$, a third strongest PRS $P_3$, with a relative beam metric to $P_1$ of value $r_3$, . . . . Wherein, the relative beam metrics can be the ratio between the RSRP or the SINR of the corresponding PRS and that of the strongest PRS in dB or in absolute value. For example:

$$r_i = \frac{RSRP_i}{RSRP_1} \text{ or } r_i = RSRP\_dB_i - RSRP\_dB_1.$$

A UE that measures a PRS profile PP finds a closet PRS profile $PP_T$, for which a TCI state (or TCI state ID) or spatial relation is provided and associates PRS profile PP, with the corresponding TCI state (or TCI state ID) or spatial relation. In one example, finding the closet PRS profile can proceed in order of the strongest PRS, e.g., finding the closet PRS profile based on the strongest PRS, if multiple PRS profiles are found proceeding to the second strongest PRS to find the closet PRS profile within the multiple PRS profiles found and so on. For the closest PRS profile found $PP_T$, a UE finds the corresponding closest velocity vector $(V_{Tx}, V_{Ty})$ for which a TCI state or spatial relation is provided, and associates PRS profile PP and velocity vector $(V_x, V_y)$, with the corresponding TCI state or spatial relation. The association, linkage or mapping of TCI states (or TCI state IDs) or spatial relation to a positioning measurement profile or PRS profile (e.g., $PP_T$), and velocity (e.g., $(V_{Tx}, V_{Ty})$), can be configured or updated by RRC signaling and/or MAC CE signaling.

In a variant of example 3.6, a speed (rather than velocity) can be used for the linkage or association with a TCI state.

TABLE 10

| TCI State | PRS Profile | | | | | Velocity Vector | |
|---|---|---|---|---|---|---|---|
| | P1 | P2 | r2 | P3 | r3 | VTx | VTy |
| T1 | P1_1 | — | — | — | — | Vx1 | Vy1 |
| T2 | P2_1 | P2_2 | r2_2 | — | — | Vx2 | Vy2 |
| T3 | P3_1 | P3_2 | r3_2 | P3_3 | r3_3 | Vx3 | Vy3 |

In another example 3.7, a UE can report to the network the UE's position (X, Y) and velocity vector $(V_x, V_y)$ (or speed) in a positioning measurement report. A UE uses the TCI State (or TCI state ID) or Spatial Relation T associated or linked with (X, Y) and $(V_x, V_y)$ (or speed) (example 3.5.1) after a period Δ from the time of the positioning measurement report. Wherein, Δ can be configured and/or updated by RRC signaling and/or by MAC CE signaling. In another example Δ can be included in a positioning measurement report.

In another example 3.8, a UE can report to the network PRS measurements and velocity vector $(V_x, V_y)$ (or speed) (or velocity/speed-related measurements) in a positioning measurement report. Wherein, PRS measurements can be for example RSRP of a PRS and/or SINR of a PRS and/or DL-PRS-RSTD and/or UE RX-TX time difference measurements. A UE uses the TCI State (or TCI state ID) or Spatial Relation T associated or linked with PRS profile PP and $(V_x, V_y)$ (or speed) (example 3.6) after a period Δ from the time of the positioning measurement report. Wherein, Δ can be configured and/or updated by RRC signaling and/or by MAC CE signaling. In another example Δ can be included in a positioning measurement report.

The present disclosure includes: (1) predictive beam management—indication of a future TCI state(s) along with activation time; (2) UE reports position and velocity to estimate near future trajectories; (3) UEs provide beam measurement reports along with determined-position or positioning-related measurements and optionally time of beam measurement; and (4) linkage between TCI state and UE position or positioning measurements.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to:
receive configuration information for transmission configuration indication (TCI) states,
receive a beam indication including information indicating a number of TCI states and a number of corresponding TCI state application times, and
transmit a channel carrying an acknowledgment for the beam indication, wherein the TCI state application times are related to a time of the transmission of the channel; and
a processor operably coupled to the transceiver, the processor configured to determine, for one or more TCI states in the number of TCI states, at least one of downlink (DL) quasi-co-location (QCL) properties for DL communication and an uplink (UL) spatial domain filter for UL communication, wherein the transceiver is further configured to at least one of:
  receive, using the determined DL QCL properties, DL channels starting at the corresponding TCI state application times, and
  transmit, using the determined UL spatial filter, UL channels starting at the corresponding TCI state application times.

2. The UE of claim 1, wherein:
the transceiver is further configured to:
  receive configuration information for beam indications, wherein the beam indications include a number of pairs of a TCI state identifier (ID) and a TCI state activation time, and
  receive information indicating a beam indication ID, and
the processor is further configured to identify the number of TCI states and the corresponding TCI state application times based on the beam indication ID.

3. The UE of claim 1, wherein the transceiver is further configured to transmit a beam report that includes:
  a reference signal identifier (ID),
  a measurement of quality corresponding to the reference signal ID, and
  a time stamp corresponding to the measurement.

4. The UE of claim 1, wherein the transceiver is further configured to transmit a report that includes:
  UE location information or positioning measurements, and
  a time stamp corresponding to the UE location information or positioning measurements.

5. The UE of claim 1, wherein the transceiver is further configured to transmit a report that includes:
  UE velocity information, Doppler shift measurements, or Doppler spread measurements, and
  a time stamp corresponding to the UE velocity information, Doppler shift measurements, or Doppler spread measurements.

6. The UE of claim 1, wherein:
the transceiver is further configured to receive configuration information indicating a number of UE locations corresponding to the number of TCI states, and
the processor is further configured to:
  identify a location of the UE,
  determine a TCI state from the number of TCI states corresponding to the location of the UE, and
  determine the at least one of the DL QCL properties for the DL communication and the UL spatial domain filter for the UL communication for the determined TCI state.

7. The UE of claim 1, wherein:
the transceiver is further configured to receive configuration information indicating a number of UE positioning measurements corresponding to the number of TCI states, and
the processor is further configured to:
  identify positioning measurements of the UE,
  determine a TCI state from the number of TCI states corresponding to the positioning measurements of the UE, and
  determine the at least one of the DL QCL properties for the DL communication and the UL spatial domain filter for the UL communication for the determined TCI state.

8. A base station (BS), comprising:
a transceiver configured to:
  transmit configuration information for transmission configuration indication (TCI) states,
  transmit a beam indication including information indicating a number of TCI states and a corresponding number of TCI state application times, and
  receive a channel carrying an acknowledgement for the beam indication, wherein the TCI state application times are related to a time of the transmission of the channel; and
a processor operably coupled to the transceiver, the processor configured to determine, for one or more TCI states in the number of TCI states, at least one of downlink (DL) quasi-co-location (QCL) properties for DL communication and an uplink (UL) spatial domain filter for UL communication,
wherein the transceiver is further configured to at least one of:
  transmit, using the determined DL QCL properties, DL channels starting at the corresponding TCI state application times, and
  receive, using the determined UL spatial filter, UL channels starting at the corresponding TCI state application times.

9. The BS of claim 8, wherein:
the transceiver is further configured to transmit configuration information for beam indications; wherein the beam indications include a number of pairs of a TCI state identifier (ID) and a TCI state activation time,
the processor is further configured to determine a beam indication ID, and
the transceiver is further configured to transmit information indicating the beam indication ID to indicate information about the number of TCI state IDs and the corresponding TCI state application times.

10. The BS of claim 8, wherein:
the transceiver is further configured to receive:
  first information that includes a reference signal identifier (ID), a measurement of quality corresponding to the reference signal ID, and a time stamp corresponding to the measurement, and
  second information that includes (i) one of user equipment (UE) location information or positioning measurements and (ii) a time stamp corresponding to the one of UE location information or positioning measurements,
the first information is received in a beam report,
the second information is received in the beam report or a separate report, and
the processor is further configured to determine an association between a TCI state and the one of UE location information or positioning measurements.

11. The BS of claim 8, wherein:
the transceiver is further configured to receive a report from a user equipment (UE),
the report includes:
  UE location information or positioning measurements, and
  a time stamp corresponding to the UE location information or positioning measurements, and
the processor is further configured to determine, based on the report, the number of TCI states and corresponding number of TCI state application times to signal to the UE.

12. The BS of claim 8, wherein:
the transceiver is further configured to receive a report from a user equipment (UE),
the report includes:
  UE velocity information, Doppler shift measurements, or Doppler spread measurements, and
  a time stamp corresponding to the UE velocity information, the Doppler shift measurements, or the Doppler spread measurements, and
the processor is further configured to determine, based on the report, the number of TCI states and corresponding number of TCI state application times to signal to the UE.

13. The BS of claim 8, wherein:
the transceiver is further configured to transmit configuration information indicating a number of user equipment (UE) locations corresponding to the number of TCI states, and
the processor is further configured to:
  identify a location of a UE,
  determines a TCI state from the number of TCI states corresponding to the location of the UE, and
  determine the at least one of the DL QCL properties for the DL communication and the UL spatial domain filter for the UL communication for the determined TCI state.

14. The BS of claim 8, wherein:
the transceiver is further configured to transmit configuration information indicating a number of user equipment (UE) positioning measurements corresponding to the number of TCI states, and
the processor is further configured to:
  identify positioning measurements of the UE,
  determine a TCI state from the number of TCI states corresponding to the positioning measurements of the UE, and
  determine the at least one of the DL QCL properties for the DL communication and the UL spatial domain filter for the UL communication for the determined TCI state.

15. A method of operating a user equipment (UE), comprising:
receiving configuration information for transmission configuration indication (TCI) states;
receiving a beam indication including information indicating a number of TCI states and a number of corresponding TCI state application times,
transmitting a channel carrying an acknowledgement for the beam indication, wherein the TCI state application times are related to a time of the transmission of the channel;
determining, for one or more TCI states in the number of TCI states, at least one of downlink (DL) quasi-co-location (QCL) properties for DL communication and an uplink (UL) spatial domain filter for UL communication; and
at least one of:
  receiving, using the determined DL QCL properties, DL channels starting at the corresponding TCI state application times; and
  transmitting, using the determined UL spatial filter, UL channels starting at the corresponding TCI state application times.

16. The method of claim 15, further comprising:
receiving configuration information for beam indications, wherein the beam indications include a number of pairs of a TCI state identifier (ID) and a TCI state activation time;
receiving information indicating a beam indication ID; and
identifying the number of TCI state IDs and the corresponding TCI state application times based on the beam indication ID.

17. The method of claim 15, further comprising transmitting a beam report that includes:
a reference signal identifier (ID),
a measurement of quality corresponding to the reference signal ID, and
a time stamp corresponding to the measurement.

18. The method of claim 15, further comprising transmitting a report that includes:
UE location information or positioning measurements, and
a time stamp corresponding to the UE location information or positioning measurements.

19. The method of claim 15, further comprising:
receiving configuration information indicating a number of UE locations corresponding to the number of TCI states;
identifying a location of the UE; and
determining a TCI state from the number of TCI states corresponding to the location of the UE,
wherein determining the at least one of the DL QCL properties and the UL spatial domain filter further comprises determining the at least one of the DL QCL properties for the for DL communication and the UL spatial domain filter for the UL communication for the determined TCI state.

20. The method of claim 15, further comprising:
receiving configuration information indicating a number of UE positioning measurements corresponding to the number of TCI states;
identifying positioning measurements of the UE; and
determining a TCI state from the number of TCI states corresponding to the positioning measurements of the UE,
wherein determining the at least one of the DL QCL properties and the UL spatial domain filter further comprises determining the at least one of the DL QCL properties for the for DL communication and the UL spatial domain filter for the UL communication for the determined TCI state.

* * * * *